United States Patent [19]

Cress et al.

[11] Patent Number: 4,559,765

[45] Date of Patent: Dec. 24, 1985

[54] APPARATUS FOR MANUFACTURING FOAM PLASTIC CONTAINERS BY USE OF A TUBULAR FORMING MANDREL

[75] Inventors: Allan K. Cress, Baltimore; Charles E. Busse, Jarrettsville, both of Md.

[73] Assignee: Maryland Cup Corporation, Owings Mills, Md.

[21] Appl. No.: 395,469

[22] Filed: Jul. 6, 1982

Related U.S. Application Data

[60] Division of Ser. No. 169,896, Jul. 17, 1980, Pat. No. 4,365,460, which is a continuation of Ser. No. 899,848, Apr. 25, 1978, abandoned, which is a continuation-in-part of Ser. No. 665,617, Mar. 10, 1976, Pat. No. 4,121,402.

[51] Int. Cl.[4] .......................... B65B 43/08; B65B 3/02
[52] U.S. Cl. ........................................ 53/557; 493/109
[58] Field of Search ................ 53/442, 441, 557, 556, 53/563; 493/109, 108, 105, 104, 159, 158

[56] References Cited

U.S. PATENT DOCUMENTS 4,121,402  10/1978  Cress et al. ........................... 53/452
4,365,460  12/1982  Cress et al. ........................... 53/563

Primary Examiner—James E. Coan
Attorney, Agent, or Firm—McDougall, Hersh & Scott

[57] ABSTRACT

The present invention is directed to an apparatus and method wherein preprinted rectangular blanks of longitudinally stretch-oriented foam sheet material are continuously formed into cylinders by a tubular forming mandrel on which the blanks are folded, seamed and thereafter transferred onto final forming mandrels. Subsequently, the blanks and the final mandrels are heated to shrink the blanks so that they assume the shape of the final forming mandrels. In forming containers, means are provided to place bottom blanks on the product mandrels prior to the loading of the cylinders thereon so as to shrink the cylinders to sidewall shapes overlying the bottom blanks. The top curl on containers such as drinking cups and food tubs is formed after shrink forming. Further, the bottom seam of the container may be reinforced by ironing after shrink forming.

28 Claims, 30 Drawing Figures

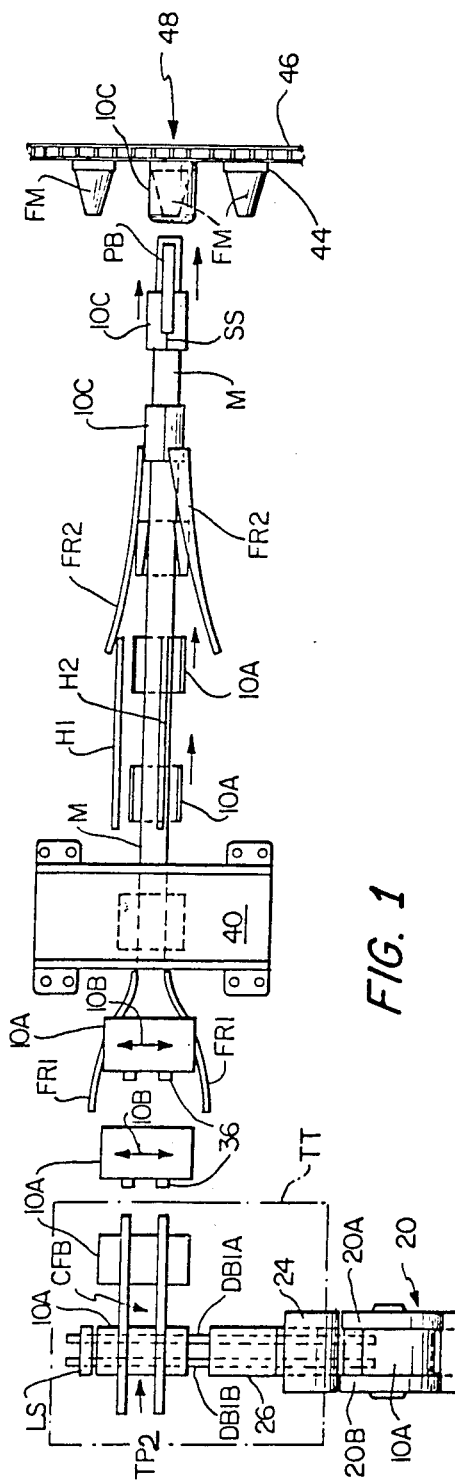
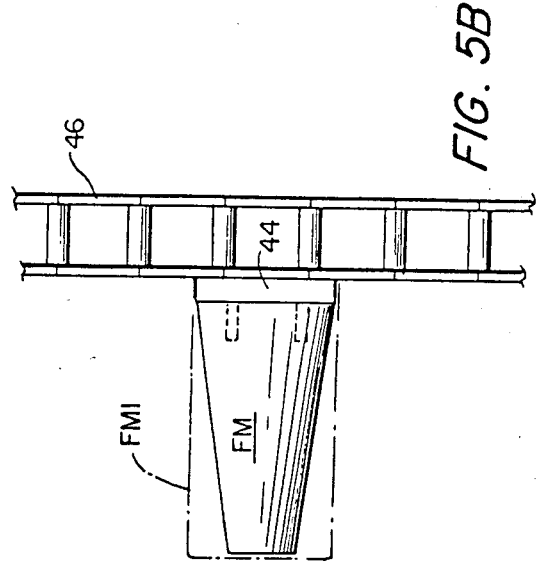
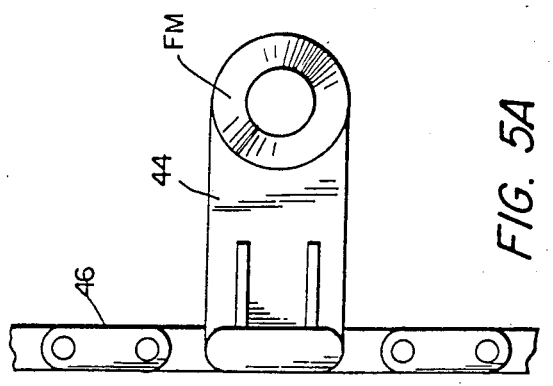
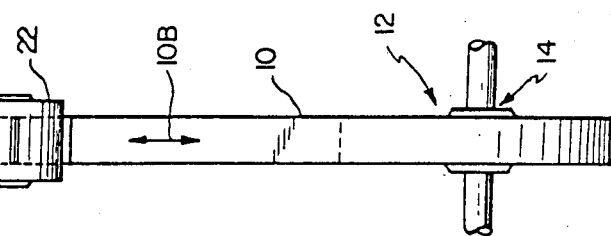

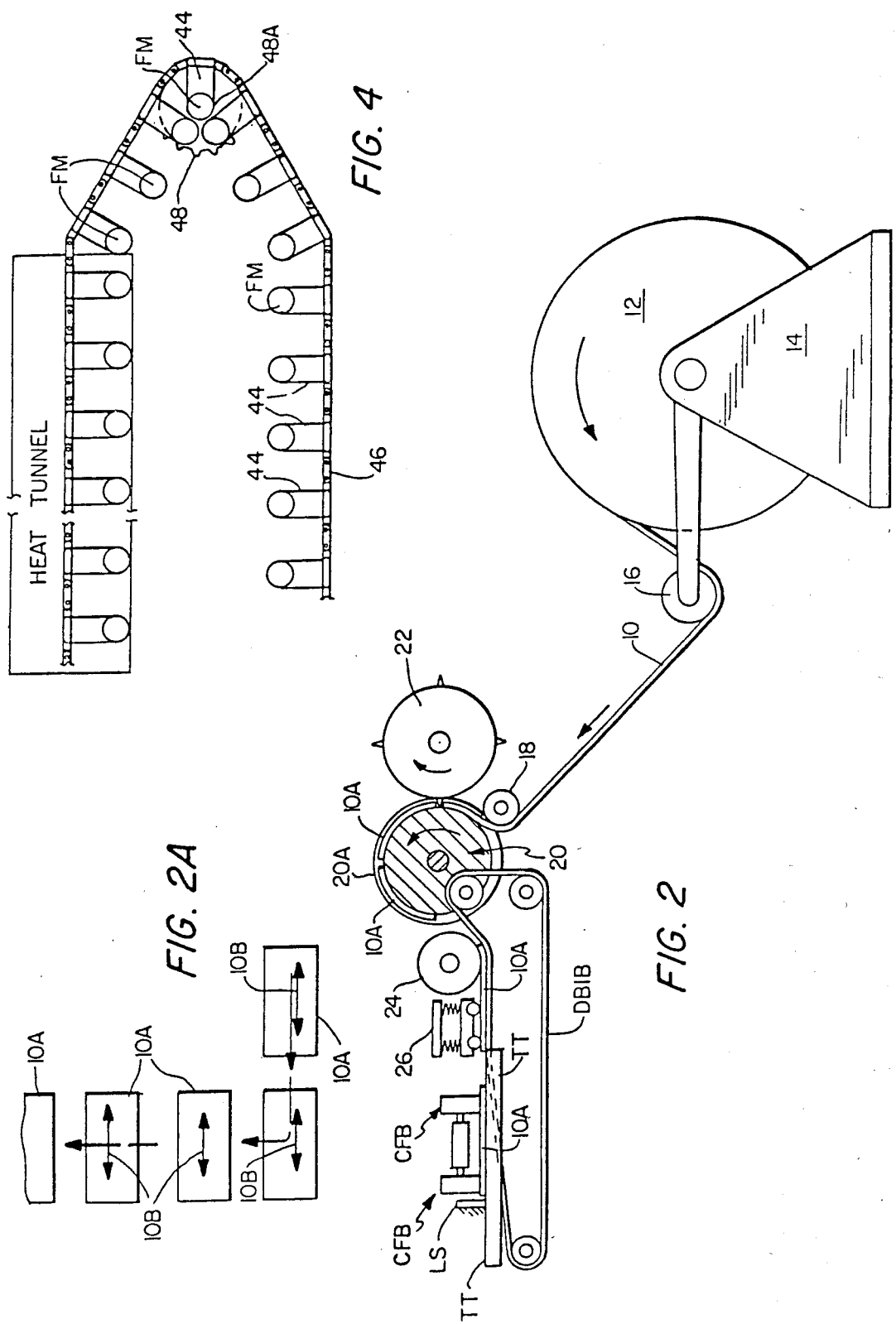

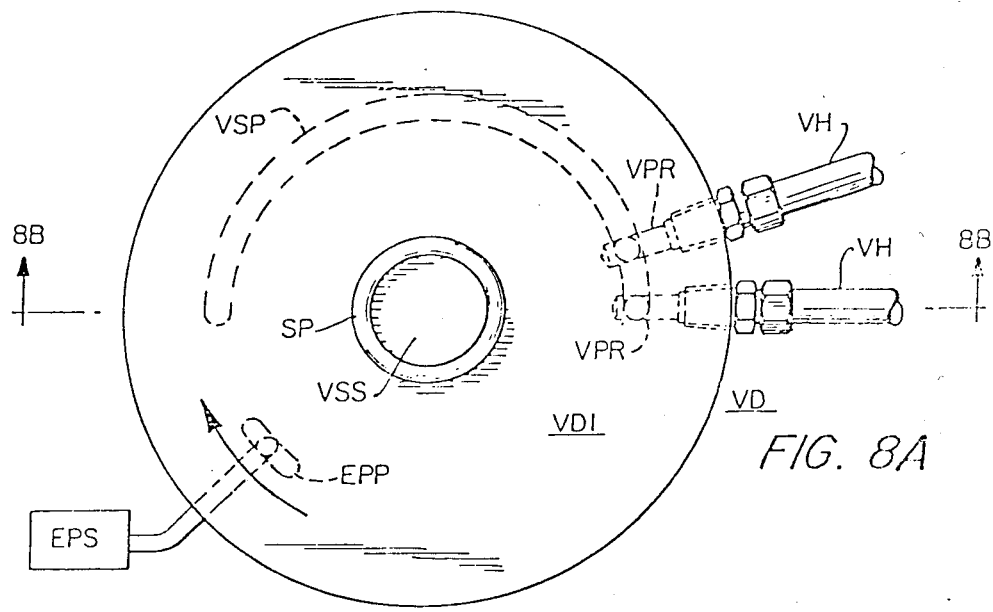
FIG. 8A
FIG. 8B
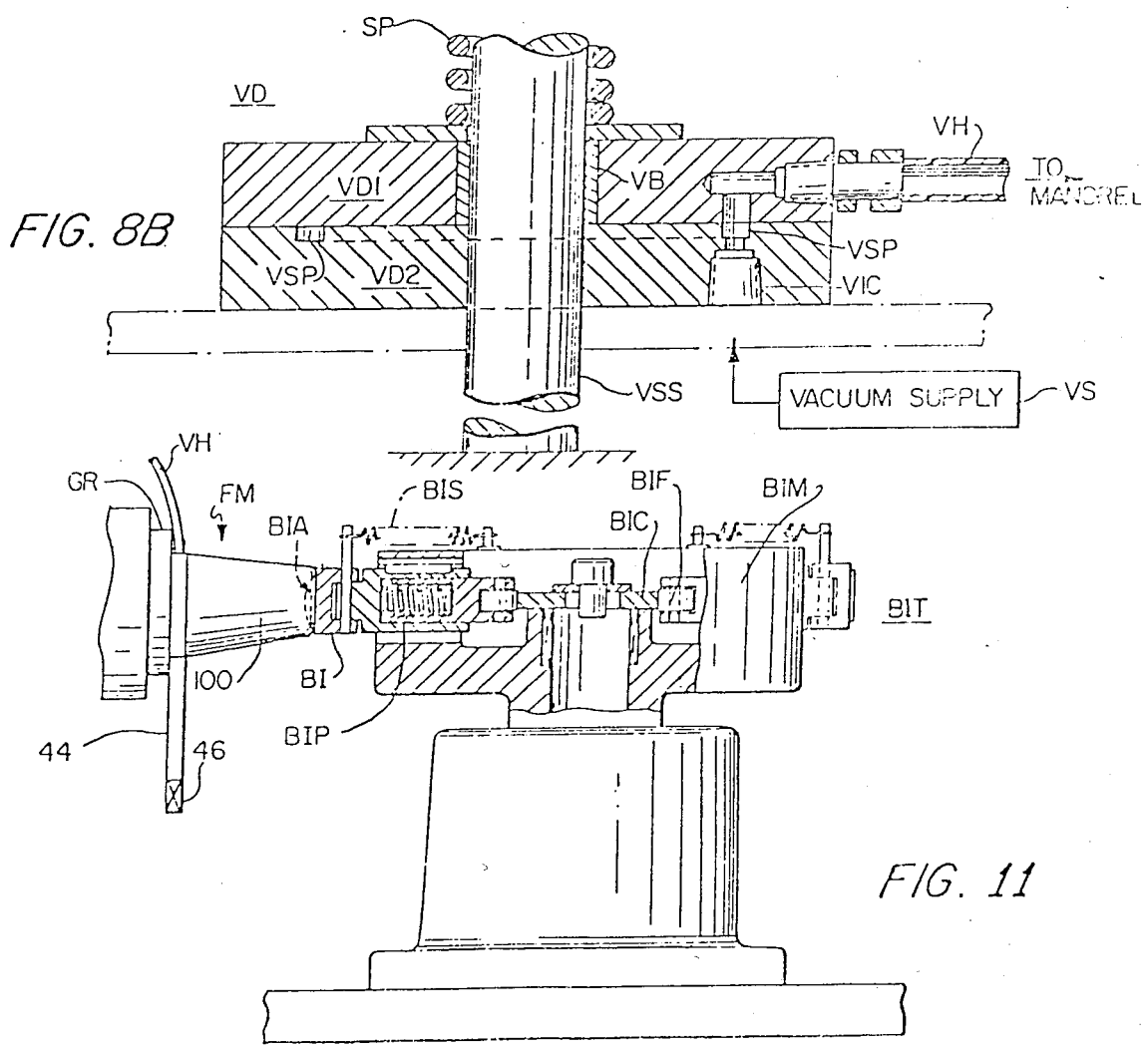
FIG. 11

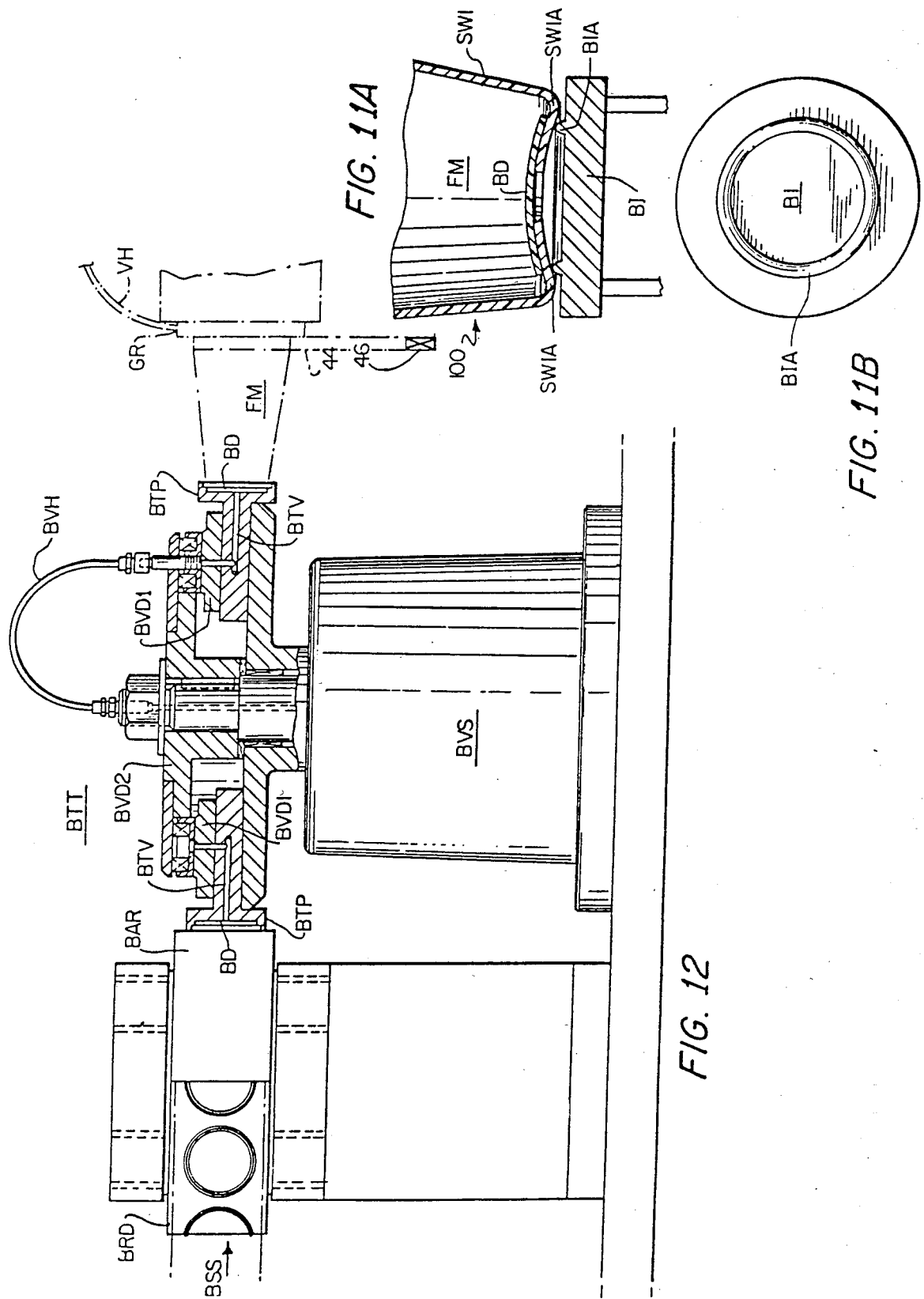

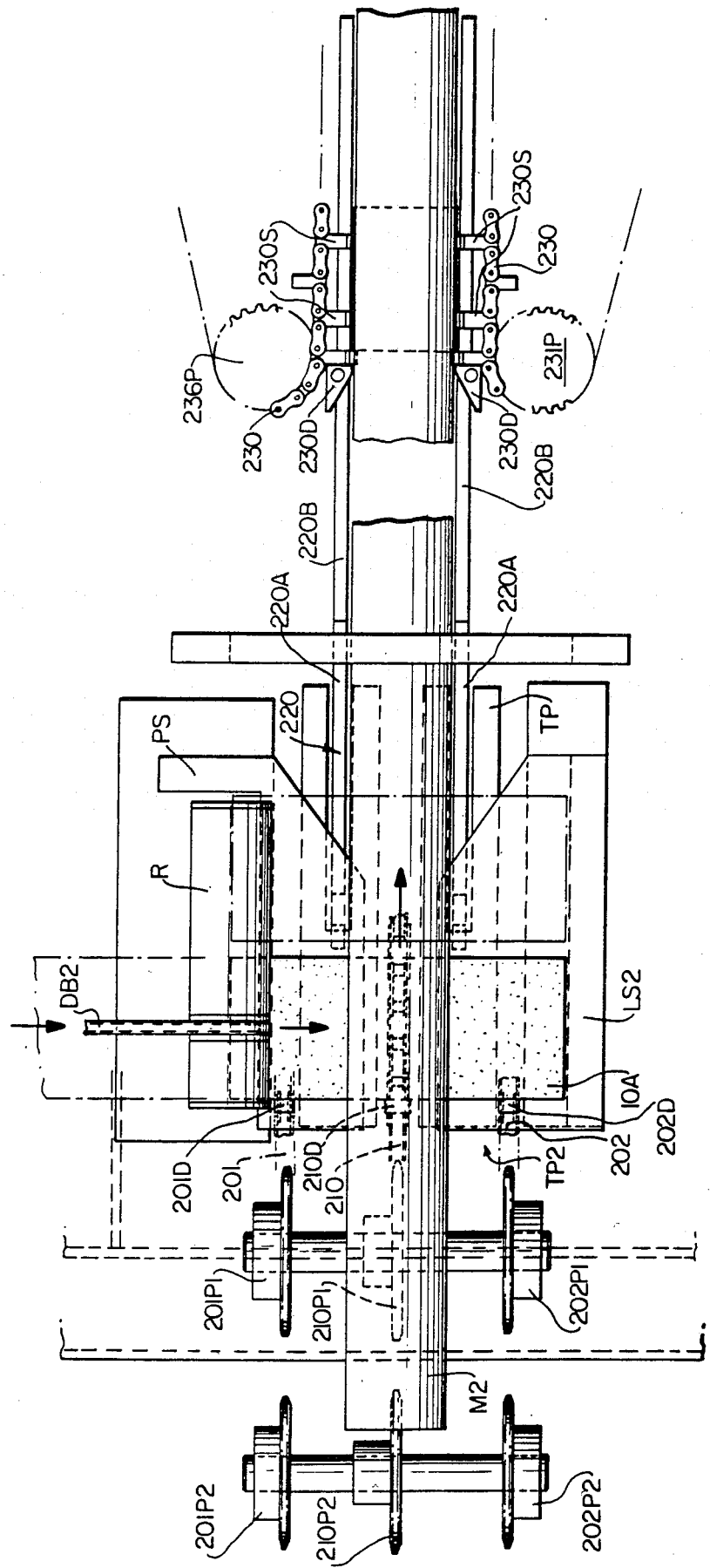

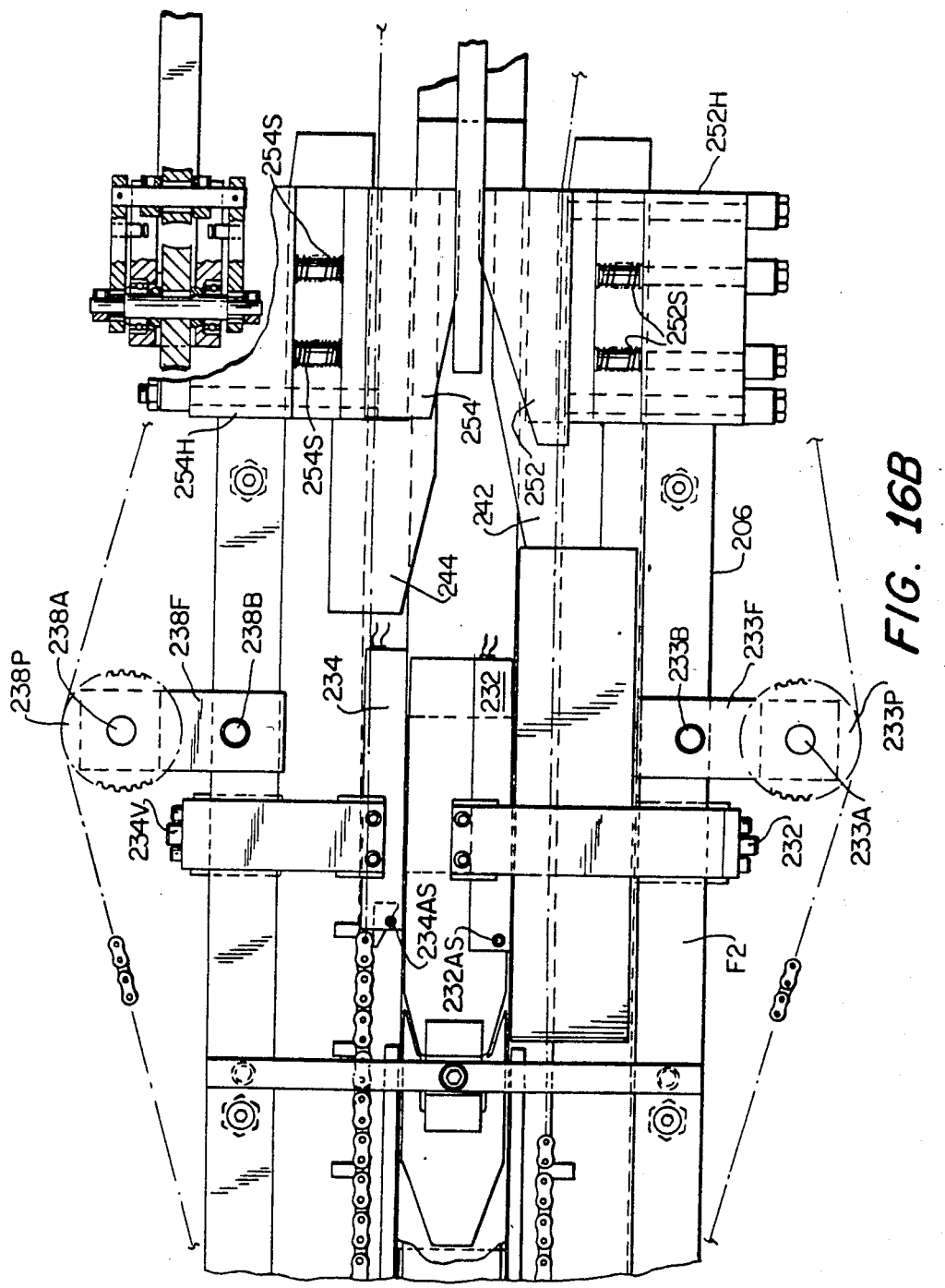

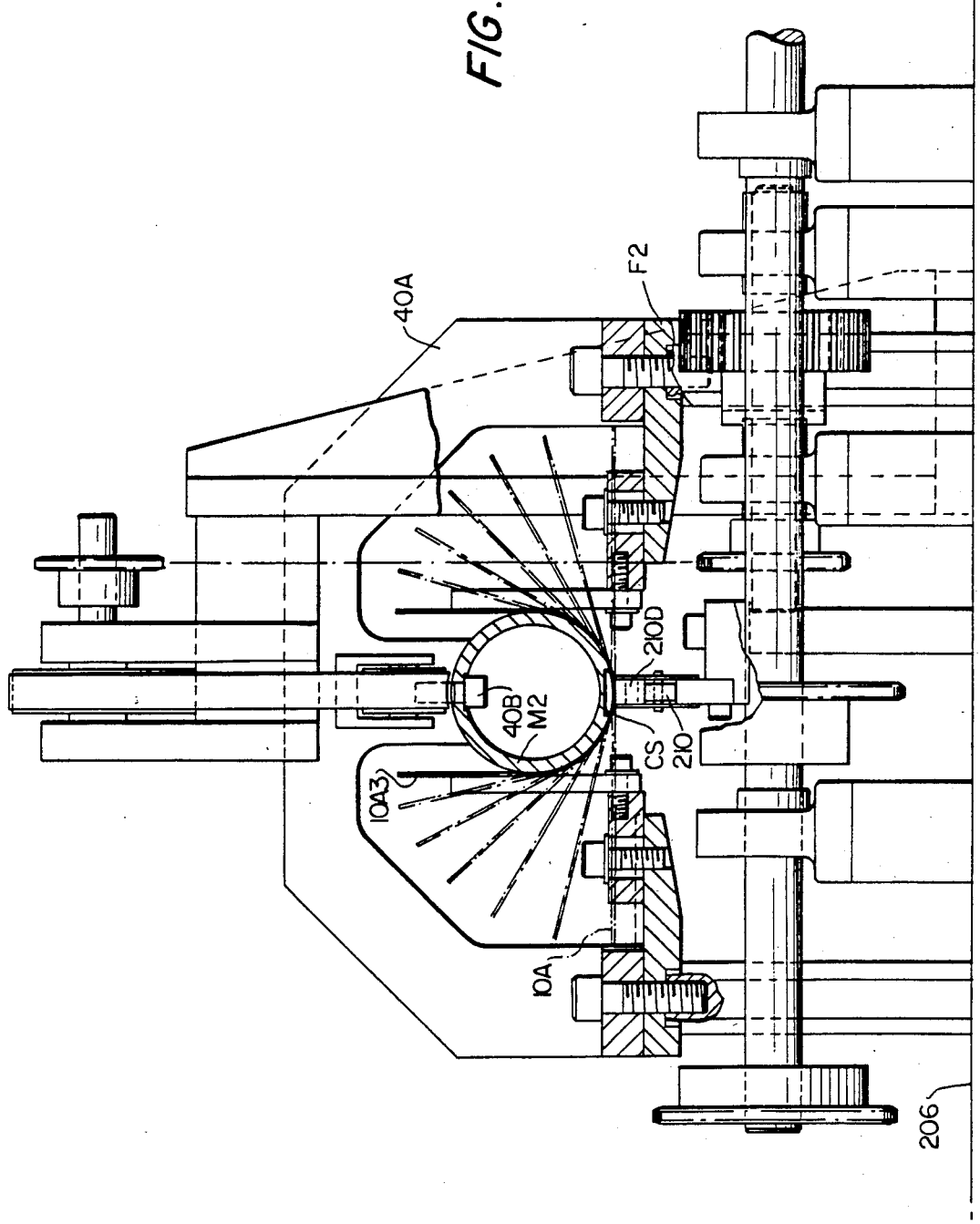

APPARATUS FOR MANUFACTURING FOAM PLASTIC CONTAINERS BY USE OF A TUBULAR FORMING MANDREL

CROSS-REFERENCE TO RELATED APPLICATIONS

This application is a division of Ser. No. 169,896, filed July 17, 1980, now U.S. Pat. No. 4,365,460, which was a continuation of Ser. No. 899,848, filed Apr. 25, 1978, now abandoned, which was a continuation-in-part of Ser. No. 655,617, filed Mar. 10, 1976, now U.S. Pat. No. 4,121,402.

FIELD OF THE INVENTION

This invention relates to a method and apparatus for forming containers by use of a tubular forming mandrel and more particularly, to a method and apparatus for forming containers from heat-shrinkable material such as foamed plastic sheets and the like.

BACKGROUND OF THE INVENTION

It is known in the art to shrink form containers such as drinking cups from preformed tubular lengths of circumferentially oriented thermoplastic material such as foamed polystyrene.

One particularly desirable method of initially forming a tubular length of such circumferentially oriented material is to provide rectangular-preprinted blanks and wrap these blanks around a mandrel whereon a heat sealed seam is effected longitudinally along the circumference of the formed tubular length. The use of rectangular blanks facilitates pre-printing of patterns, designs, logos, etc., on the blanks such that the ultimate tubular lengths and containers formed therefrom will bear the ultimately desired indicia.

A further advantage of the rectangular blank is that it may be cut from an extruded sheet of thermoplastic or thermoplastic foam which is stretched longitudinally, i.e., in the most logical, natural and facile direction of stretch after extrusion, namely, the machine direction, to achieve the necessary circumferential orientation in a tubular length or cylinder formed from the rectangular blank.

Previous efforts to handle these rectangular blanks and form them into cylinders, however, have required relatively elaborate systems of transfer rollers, turrets with multiple mandrels thereon and vacuum systems to properly index leading and/or trailing edges of the rectangular blanks on the transfer rollers or mandrels.

OBJECTS OF THE INVENTION

It is, therefore, an object of the present invention to provide a new and novel method and apparatus for manufacturing cylinders a shrink-formed containers from rectangular blanks of heat shrinkable plastic material such as foamed polystyrene.

Another object of the present invention is to provide a new and novel method and apparatus for continuously producing shrinkable cylinders from rectangular blanks without the use of multiple mandrels or vacuum holding means for the rectangular blanks.

A further object of the present invention is to provide a new and novel method and apparatus for continuously producing shrinkable cylinders from rectangular blanks by means of a tubular forming mandrel on which the blanks are folded, seamed and transferred onto final forming mandrels. Subsequently, the blanks and the final forming mandrels are heated to shrink the blanks so that they assume the shape of the final forming mandrels.

These and other objects of the present invention will become more fully apparent with reference to the following specification and drawings which relate to preferred embodiments of the present invention.

SUMMARY OF THE INVENTION

A convolute roll of elongated preprinted stock of longitudinally oriented heat shrinkable material such as polystyrene foam is unwound to feed the stock to a rotary cutter which severs the feed stock into rectangular blanks of substantially identical dimensions. The cut blanks are fed by feed belts on their longitudinal axes and subsequently fed on their transverse axes by means of pusher dogs through a progressive series of forming rails adjacent a single elongated tubular forming mandrel until a tubular length or cylinder having a lapped side seam is formed about the tubular forming mandrel by each blank. In a first embodiment, a heated pressure belt may effect a heat sealed side seam and discharges the cylinder from the tubular forming mandrel onto a final forming mandrel indexed to dwell in coaxial registry with the tubular forming mandrel and formed cylinder during the discharge of each cylinder from the tubular forming mandrel.

The final forming mandrels have bottom and sidewall defining portions and are shaped in cross section like a desired ultimate container such as a cylindrical food can with a rounded bottom edge or a frusto-conical drinking cup. A bottom blank may be placed on the final forming mandrels and held there by vacuum while the sidewall of the ultimate container, namely, the tubular length or cylinder is transferred from the initial forming mandrel onto the final forming mandrel.

Once both components of the basic container or cup are on a given final forming mandrel, each such final forming mandrel is constrained out of registry with the tubular forming mandrel and translated through a heat tunnel to shrink the cylinder or tubular length into conformity with the sidewall slope of the final forming mandrel to provide the desired container shape.

In all cases in the preferred embodiments of the present invention, the cylinders exceed the axial length of the final forming mandrels such that the bottom edge of the sidewall shrinks around the outer edges of bottom blank to provide a heat sealable bottom seam. The final heat sealing is effected by any suitable heating means such as a conformally shaped contact heater.

Where a cup-shaped (frusto-conical) container is desired, a final step in the process is the forming of a top curl or bead to increase the lateral stiffness of the container and ensure drinking comfort. In the case of a food container of a more conventional substantially cylindrical shape, the steps of filling and closing by the application of a suitable lid or closure represent the final steps.

Therefore, the present invention clearly contemplates and provides for the in-line manufacture of containers from heat shrinkable plastic in a food packing line of the type wherein metered charges of food, etc., are placed and sealed within a succession of containers presented at a filling station.

Therefore, in food processing plants where food containers for coleslaw, pickled vegetables, potato salad, cottage cheese and other products not pressure packed, no large storage area for containers would be necessary with the present invention.

Instead, rolls of material for a large number of materials could be stored in much less space than that required for containers. Furthermore, since the containers would be made as they are used, the problems of inventories and supply of previously manufactured containers would be substantially obviated.

BRIEF DESCRIPTION OF THE DRAWINGS

FIG. 1 is a top plan view of a blank handling, cylinder forming and cylinder transferring mechanism of the present invention;

FIG. 2 is a side elevation of the feed roll, rotary cutter and right angle transfer belts of the present invention;

FIG. 2A is a top plan schematic illustrating the stretch orientation of cut rectangular blanks as they undergo the right angle transfer from the rotary cutter to the cylinder forming means of the present invention;

FIG. 4 is a schematic side elevation of a forming mandrel drive, transfer station and forming oven of the present invention;

FIG. 5A is a detail of a forming mandrel, mount and drive chain in side elevation;

FIG. 5B is a top elevation of the detail of FIG. 5A with an alternate form of forming mandrel shown in dotted lines therein;

FIG. 8A is a top view of a vacuum distributor of the present invention;

FIG. 8B is a side elevation in cross section of the vacuum distributor of FIG. 8A taken along line 8B—8B of FIG. 8A;

FIG. 11 is a cross section of the bottom finishing station taken along line 11—11 of FIG. 9;

FIG. 11A is an enlarged cross-sectional illustration of a bottom iron engaging a container bottom on a mandrel of the present invention during bottom sealing;

FIG. 11B is a top plan view of the bottom iron of FIGS. 9, 10, 11 and 11A;

FIG. 12 is a cross section taken along line 12—12 of FIG. 9;

FIG. 16A is a top plan view of a blank handling and cylinder forming mechanism of an embodiment of the present invention;

FIG. 16B is a continuation of the top plan view of a blank handling and cylinder forming mechanism as illustrated in FIG. 16A;

FIG. 18 is a cross-sectional view of the blank handling and cylinder forming mechanism shown in FIGS. 16A through 16C and illustrating in broken and solid lines the various positions of a blank as it is initially formed into a U-shape.

DETAILED DESCRIPTION OF THE DRAWINGS

Figure 3:
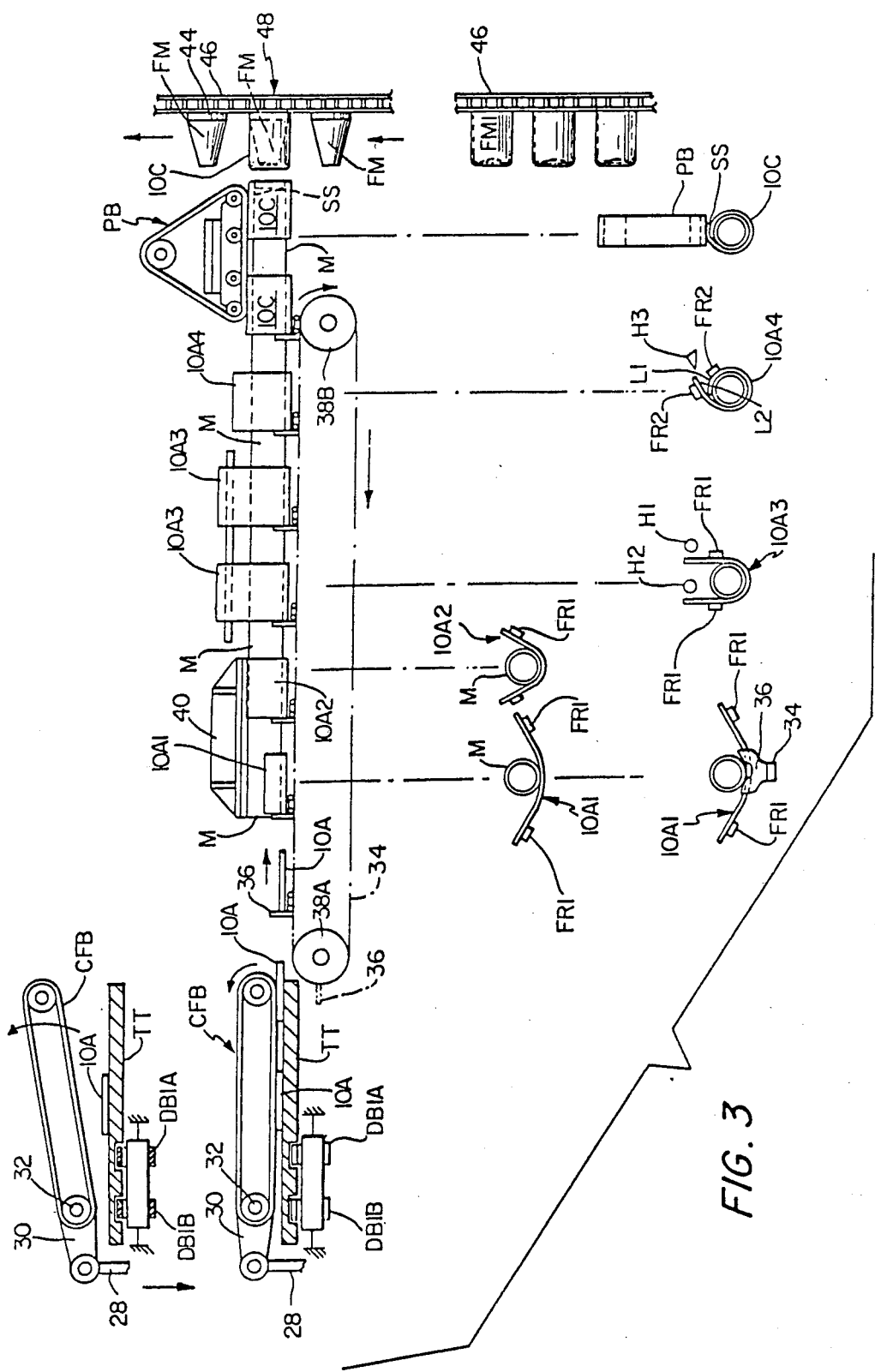
FIG. 3 is an exploded schematic illustrating in correlated cross section the various forming stages of the present invention in converting a rectangular blank into a cylinder by continuous movement of the blank along a fixed mandrel.

Referring to FIGS. 1 and 2 the material 10 from which the intermediate cylinders and ultimate containers are to be made is shown as an elongated strip convolutely wound in the form of a large supply roll 12 rotatably mounted on a suitable stanchion or support 14.

The feed material 10 is unwound from the supply roll 12 and passed beneath a tension roller 16 (FIG. 2) and a guide roller 18 into contact with a vacuum feed drum 20 which cooperates with a synchronized rotary cutter means 22 to sever the end of the feed material 10 into uniform rectangular blanks 10A.

The feed material 10 is stretch oriented for enhanced heat shrink characteristics in the direction 10B which is parallel to the long dimension of the ultimate rectangular blanks 10A.

As the blanks 10A are released from the downstream side of the vacuum drum 20, the latter being flanged at 20A, 20B to contain the narrower width of the feed material 10 between the flanges 20A, 20B as shown in FIGS. 1 and 2, an upper pinch roll 24 and blank bottom engaging pair of drive belts DB1A and DB1B entrain the leading edge of each successive blank 10A. Each blank 10A is fed on its longitudinal axis by the drive belts DB1A, DB1B beneath a biased retaining guide 26 to a right angle transfer point TP2.

At the transfer point TP2 a set of cross-feed belts CFB are located adjacent a limit stop means LS which abuts with and positions each rectangular blank 10A for lateral transfer by the said cross-feed belts CFB.

The drive belts DB1A and DB1B pass at an angle through suitable slots in the surface of a transfer table TT such that prior to engaging the limit stop LS the blanks 10A have been accelerated by and broken contact with the drive belts DB1A and DB1B.

As shown in FIG. 3, the cross-feed belts CFB are mounted to pivot toward and away from the upper surface of the transfer table TT in synchronism with the forming of the rectangular blanks 10A and their delivery to the transfer point TP2. Thus, each said blank 10A will be transferred laterally of its longitudinal axis substantially instantaneously upon engaging the limit stop LS at the transfer point TP2.

The pivotal motion of the cross-feed belt assembly CFB is effected by means of a drag link 28 and crank arm 30 acting about a pivot point 32 as illustrated in FIG. 3.

The cross-feed belts CFB drive the blanks 10A off the transfer table TT onto a carrier chain 34 having pushers or dogs 36 thereon which engage the trailing edges of the blanks 10A and propel them along in a direction transverse to their longitudinal stretch orientation direction 10B.

Longitudinally disposed along the upper reach of the carrier chains 34 is a hollow tubular forming mandrel M which is fixed against rotation in a suitable holding bracket 40.

Leading into the bracket 40 and progressively varying in shape along the substantially entire extent of the forming mandrel M are opposed forming rails FR1, the extent of which can best be understood with reference to FIGS. 1 and 3.

As the carrier chain 34 progresses clockwise around the chain drive sprockets 38A, 38B, the pusher dogs 36 move the blanks 10A through the forming rails FR1 to bend the blanks 10A in stages 10A1 into a U-shape 10A3 about the mandrel M with the legs of the U-shaped blank 10A3 being adjacent to elongated external and internal surface heaters H1 and H2, respectively, the "external" surface being the outer surface of the innermost lap L1 of a side seam and the "internal" surface being the inner surface of the outer lap L2 of the side seam as shown in the substantially cylindrical fold 10A4 of the blank 10A effected by means of folding rails FR2 downstream from the heaters H1, H2.

A heater H3, schematically shown in FIG. 3 can be utilized to provide additional heat such as radiation or force hot air between the nearly juxtaposed laps L1 and L2.

When the cylindrical fold is completed the rectangular blank 10A has been converted into a cylinder 10C which exists the folding rails FR2 and passes under a pressure belt assembly PB which applies sufficient downward pressure on the laps L1–L2 to form a heat-sealed lapped side seam SS in the cylinder 10C while at the same time translating the cylinder 10C off the mandrel M and onto a finishing mandrel FM.

Referring to FIGS. 3, 5A and 5B, the finishing mandrels FM are shown in solid lines as having a frusto-conical (drinking-cup) shape and in dotted lines as having a substantially cylindrical shape FM1 similar to that of pressurized aluminum beverage cans.

The finishing mandrels FM are mounted on one end of support arms 44 which are mounted at their other ends on a drive chain 46 which passes about a main transfer sprocket 48 adjacent the finish end of the elongated forming mandrel M. As shown in FIGS. 1 and 3, the finished cylinders 10C are stripped from the forming mandrel M onto one of the finishing mandrels FM which is in substantially coaxial registry with the forming mandrel M.

This registry is achieved by proportioning the transfer sprocket 48 such that the arms 44 are radii thereof and place the finishing mandrels FM one-by-one at the dead center position 48A of the transfer sprocket 48 at the point of coaxial registry with the forming mandrel M. As a result, a time delay during which the finishing mandrel FM remains in such registry is effected, thereby permitting transfer of the cylinder 10C from the forming mandrel M onto the finishing mandrel FM. In another embodiment the registry of the finishing mandrel may be effected by synchronization of the discharge of the cylinder 10C from the forming mandrel M onto the finishing mandrel FM.

Once the cylinders are transferred onto the finishing mandrels FM they are conveyed on those mandrels through a suitable heat tunnel HT, the length of the latter and its temperature being correlated with the speed of the carrier chain 46 to shrink the cylinders to a frusto-conical configuration or a cylindrical configuration depending upon the shape of the finishing mandrel FM or FM1.

The shrinkable sleeves SS are longer than the mandrels FM, FM1 so as to shrink beneath the bottom defining ends of the mandrels (provide the inturned bottom or curl) of a finished container.

Figures 6A, 6B:
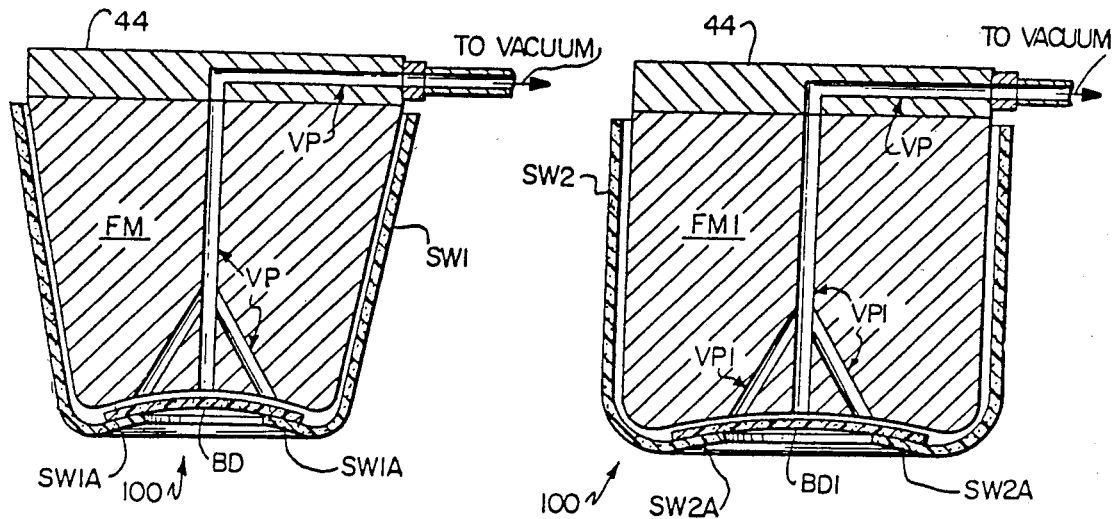
FIG. 6A is a cross section of a frusto-conical mandrel illustrating internal vacuum ports therein and a container formed thereon.
FIG. 6B is a cross section of a substantially cylindrical mandrel illustrating internal vacuum ports therein and a container formed thereon.

For example, as shown in FIG. 6A, a frusto-conical sidewall SW1 is produced by shrinking the sleeves SS on a frusto-conical mandrel FM. A bottom blank BD is provided such that the inturned edges SW1A of the sidewall SW1 will overlap the bottom blank BD after forming the sidewall from the sleeve SS.

The mandrel FM is shown as including internal vacuum ports VP which extend to a vacuum connection VC on the mounting arm 44 of the mandrels as will be more fully described with reference to FIG. 7.

For a container of a more conventional cylindrical shape such as the cross section of an aluminum beverage can or the like, reference is made to FIG. 6B in which a more cylindrical mandrel FM1 having vacuum ports VP1 is shown with a sidewall SW2 shrink formed thereon with inturned edges SW2A overlapping the periphery of a bottom blank BD1, the latter being initially held on the mandrel via the vacuum ports VP1.

Figure 7:
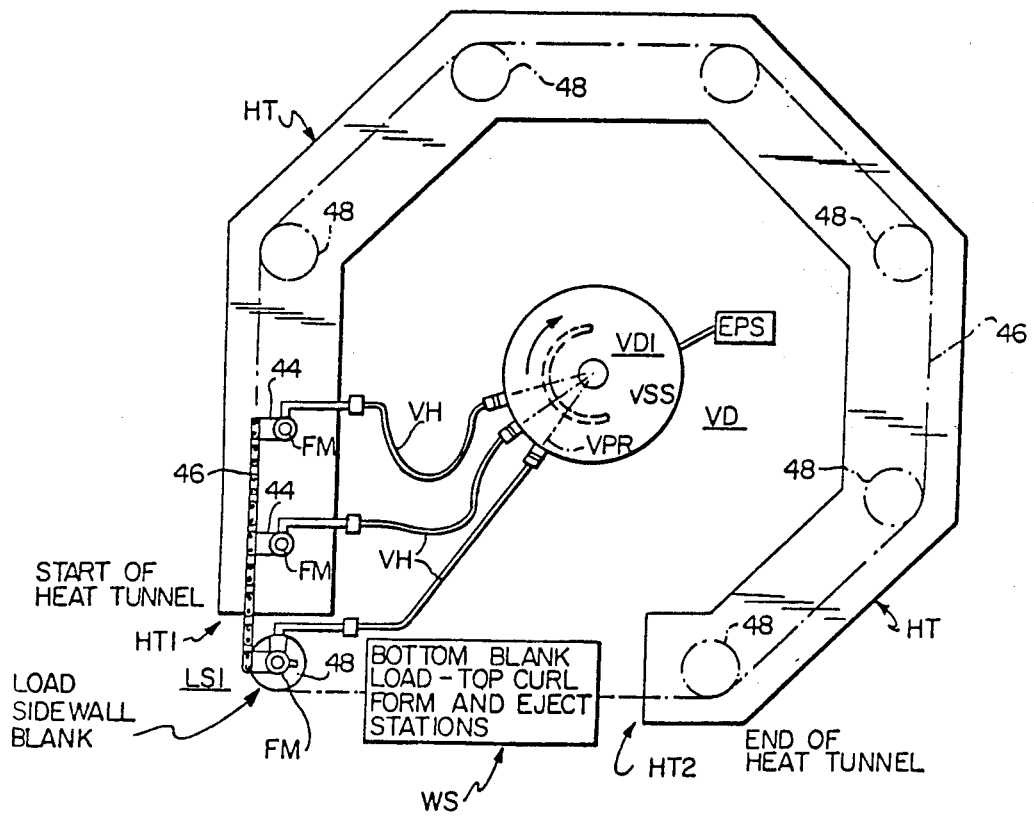
FIG. 7 is a schematic of a cup making system of the present invention.

Referring now to FIG. 7, the finishing mandrels FM (provided with a bottom blank BD as shown in FIG. 6A and to be more fully described with reference to FIGS. 9-11) are loaded with the shrinkable cylinders at a loading station LS1 in the manner previously defined in FIGS. 1-6, and the mandrels FM bearing the sidewall blanks (SW1) are progressively transported through the heat tunnel HT from the entrance HT1 thereof to the exit HT2 on the carrier chain 46 over the drive sprockets 48.

When the mandrels FM leave the exit HT2 of the heat tunnel HT they are carrying formed cups or containers of the configuration shown in FIG. 6A. These cups or containers are then subjected to bottom sealing and a top curl forming operation as will be described with reference to FIGS. 9-11.

The bottom blanks BD (BD1) of FIG. 6A (6B) are held on the mandrels FM (FM1) by means of vacuum applied through vacuum hoses VH. The vacuum hoses VH are in communication with ports VP (VP1) through the support arms 44 and said mandrels.

A vacuum distributor VD is provided centrally of the arcuatedly disposed heat tunnel HT. All of the vacuum hoses VH are manifolded into the vacuum distributor VD.

As further shown in FIGS. 8A and 8B, the vacuum distributor VD includes a top rotor plate VD1 having a plurality of radially disposed vacuum ports VPR. Each of the vacuum hoses VH is connected to a vacuum port VPR which in turn is in communication with a circular locus in the rotor disc VD1 which corresponds in size to the radius of an arcuate vacuum supply port VSP in a fixed bottom plate VD2 through which an input coupling VIC is provided to connect the supply port VSP to a vacuum source VS.

As the mandrels FM travel through the heat tunnel HT, the rotor disc VD1 rotates on a bearing VB on a support shaft VSS and is held in sufficient sealed engagement therewith. The vacuum ports VPR in the rotary disc VD1 thus come into and out of registry with the vacuum supply port VSP in the support disc VD2 causing vacuum to be applied through the hoses VH to the vacuum ports VP (VP1) in the mandrels FM (FM1) to provide the suction required to hold the bottom blanks BD (BD1) in place on the said mandrels pending the shrink forming of the sidewall blanks SW1 (SW2) to overlap the bottom blanks BD (BD1) at the inturned portions SW1A (SW2A) of the said sidewall blanks.

The arcuate length and position of the vacuum supply port VSP are thus correlated with heat shrink process and extent of travel of the mandrels FM (FM1) in the heat tunnel HT from the time the bottom blanks BD (DD1) are loaded on the said mandrels until sufficient shrinkage of the sidewalls SW1 (SW2) has been achieved to hold the said bottom blanks in place.

Also provided in the fixed bottom disc VD2 is an ejection pressure port EPP fed from an ejection pressure supply source EPS. The ejection pressure port EPP is positioned to time the application of positive pressure through vacuum ports VPR, vacuum hoses VH and vacuum ports VP (VP1) in the mandrels FM (FM1) to eject finished containers therefrom at the ejection portion of the work station WS as will be more fully described with reference to FIGS. 9 and 10.

Figure 9:
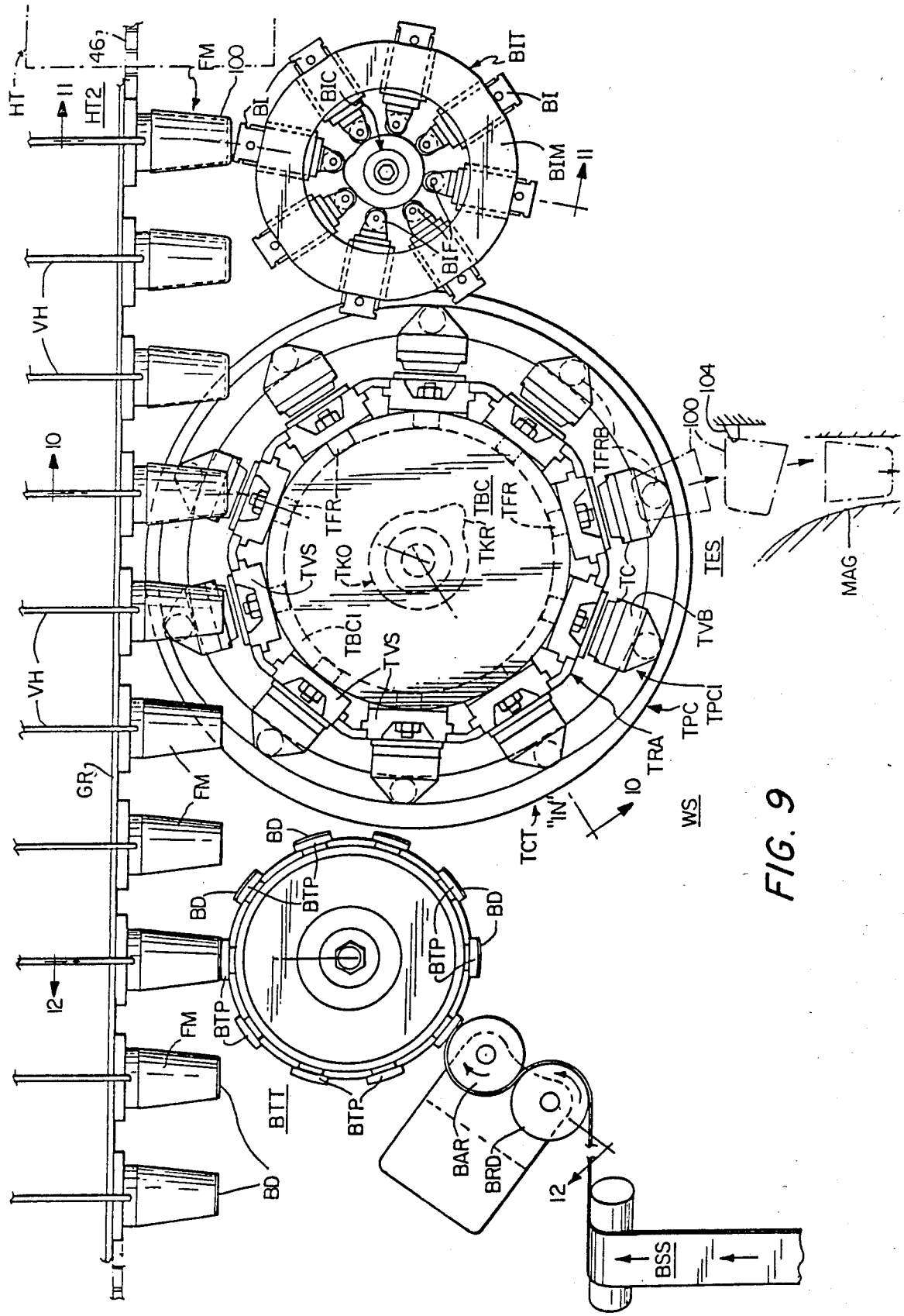
FIG. 9 is a top plan view of bottom finishing, top curl forming and container ejection stations for cup making equipment of the present invention together with a bottom blank feeding station.

Referring to FIGS. 7 and 9, a bank of work stations WS is shown including bottom blank loading, top curl forming, bottom sealing and ejection functions.

As specifically shown in FIGS. 9 and 11; the chain carried mandrels FM are passed along a juxtaposed guide rail GR as they exit the heat tunnel HT at HT2.

The guide rail GR provides a thrust backing to cooperate with a bottom ironing turret BIT having bottom irons BI in a radial array with peripheral spacing therebetween on the said turret corresponding to the spacing between adjacent finishing mandrels FM on the chain 46.

The bottom ironing turret BIT includes a rotating toroidal mounting BIM for the bottom irons BI in which the latter are radially reciprocable. A central cam BIC is provided which constrains the bottom irons BI to engage with the bottom of formed cups or containers 100 on the finishing mandrels FM by means of cam follower wheels BIF and return springs BIS (FIG. 11).

Bottom sealing pressure is regulated by a compression spring BIP mounted in a telescoping section of the bottom iron BI in opposition to the return spring BIS to prevent the bottom irons BI from engaging the bottoms of the containers 100 on the mandrels FM with more than a predetermined maximum sealing force.

As shown in FIGS. 11A and 11B, the bottom iron BI is configured with a raised annular boss BIA dimensioned to press into the inturned edges SW1A of the sidewalls SW1 of the finished cups or container 100 on the mandrel FM at a point at which the bottom blank BD is overlapped to enhance the seal therebetween and insure a liquid tight container bottom structure.

Depending on the properties of the shrinkable foam material and bottom blank material the heat of the shrinking process may provide sufficient heat to form an annular heat seal on the bottom of the containers 100 or the bottom irons BI can be heated to supply additional sealing heat.

As known in the art other heating means, adhesives, solvents or the like may also be used to enhance the ultimate bond between the inturned portions SW1A (SW2A) of the sidewalls SW1 (SW2) of the containers 100 and the bottom blanks BD (BD1).

A purely heat sealed bond is the preferred embodiment, however.

Figure 10:
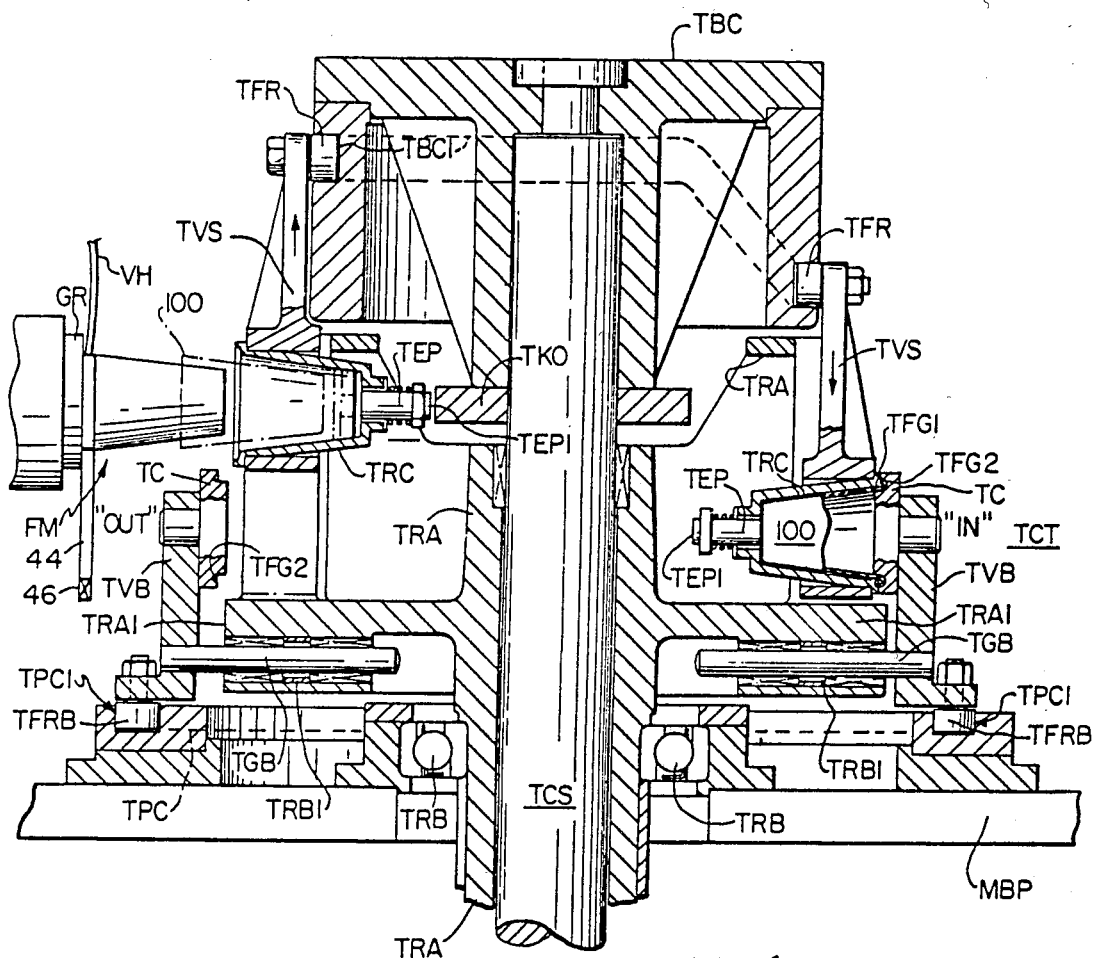
FIG. 10 is a cross-sectional view of the top curl forming station taken along line 10—10 of FIG. 9.

Referring to FIG. 10 in addition to FIG. 9, a top curl forming turret TCT is shown adjacent to the bottom ironing turret BIT for receiving finished cups or containers 100 ejected from the finishing mandrels FM and forming a top curl thereon, i.e., rolling the top rim outward on itself as is a well known practice in the cup and container art.

The top curl turret TCT is shown as including a centrally located barrel cam TBC having a cam track TBC1 in which a plurality of follower rollers TFR ride to constrain vertical movement to respective ones of a like plurality of vertical slides TVS on which are mounted radially disposed and outwardly opening cups receiving cavities TRC.

The barrel cam TBC is coaxially and fixedly mounted on the upper end of a non-rotating central shaft TCS for the turret TCT the said shaft TCS being journaled through a hub assembly TRA which is mounted for relative rotation to the shaft TCS on a machine base plate MBP in bearing means TRB.

The hub assembly TRA provides outboard slots for the vertical slide members TVS and an annular plate TRA1 beneath which a plurality of radially disposed bearing means TRB1 are provided to receive reciprocating guide bars TGB for top curl forming tools TC mounted one in registry with each cup receiving cavity TRC on vertical bars TVB each extending upward from respective guide bar TGB and a cam follower roller TFRB engaging a cam track TPC1 in an annular plate cam TPC fixedly mounted on the machine base plate MBP.

Between the hub assembly TRA and the barrel cam TBC on the central shaft TCS is an annular kick-cut cam TKO having a single kick-out rise TKR at a desired ejection station position TES (FIG. 9) to effect ejection of the containers 100 from the cavities TCR.

The kick-out cam TKO is engaged in the uppermost positions of the container cavities TRC and vertical slides TVS by the inboard tips TEP1 of ejection pin assemblies TEP which are spring biased to telescopically reciprocate in and out of the base of the container receiving cavities TRC to eject finish cups or containers 100 therefrom by a plunger action induced by the knock-out cam TKO.

Figure 10A:
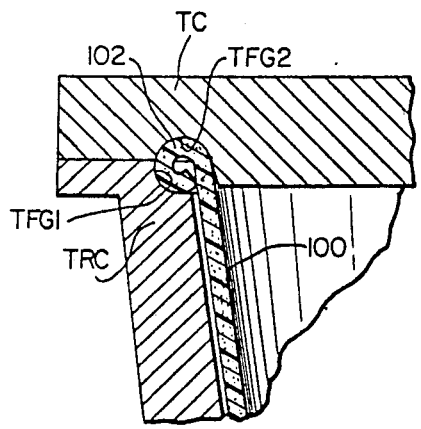
FIG. 10A is an enlarged view of the top curl tool.

Referring additionally to FIG. 10A, the top curl tool TC is shown in the "IN" position as constrained by the plate cam TPC to cause mating top curl forming surfaces TFG1 in the periphery of the cavities TRC and TFG2 in the top curl tool TC to force the top of each container 100 into the curled configuration 102 shown in FIG. 10A and at the "IN" position of the top curl tool TC in FIG. 10.

Thus, in operation, rotation of the hub assembly TRA on the central shaft TCS causes coordinated vertical movement of the slides TVS and the receiving cavities.

TCR and radial movement of the curling tools TC to maximum height and radially outward positions, respectively, at the "OUT" position in FIG. 10 and minimum height and innermost radial positions, respectively, at the "IN" position of FIG. 10.

This is effected by the coordinated shapes of the cam tracks TBC1 and TPC1 on the barrel cam TBC and plate cam TPC, respectively.

In the "OUT" position of the top curl tool TC, the receiving chamber TCR is shown in FIGS. 9 and 10 as being indexed to receive a cup or container 100 from the finishing mandrel FM as ejected therefrom by positive pressure in the vacuum hose VH.

The hub assembly TRA rotates in synchronism with the travel of the mandrels FM on the chain 46 and the receiving chambers TRC bearing a container 100 progress toward the "IN" position of FIGS. 9 and 10 in which the curling tool TC has been brought into juxtaposed registry with the receiving cavity TRC to form the top curl 102 on the container 100 (see FIG. 10A).

Subsequently, the tool TC and the receiving cavity TRC separate rapidly and the latter rapidly rises under control of the barrel cam TBC to engage the inboard end TEP1 of the ejection plunger TEP with the kick-out cam TKO and the ejection rise TKR thereon at the ejection station TES (see FIG. 9).

This ejects the containers 100 into engagement with an inverting detent 104 in a magazine chute MAG such that the finished containers are magazined in an upright position.

Prior to the placing of the cylinders 10C onto the finishing mandrels FM (FM1) a bottom blank or disc BD must be placed on the outboard end of the said mandrels to be held thereon by vacuum in the vacuum lines VH from the vacuum distributor VD as previously shown in FIGS. 6A, 6B, 8A and 8B.

To accomplish this function, a supply of bottom blanks BD and a means for transferring them from the supply to the finishing mandrels FM (FM1) must be provided.

To this end, referring jointly to FIGS. 9 and 12, bottom strip stock BSS is fed to a rotary die roller BRD and anvil roll BAD to cause the die roller to cut discs BD from the strip stock BSS and present it to a bottom transfer plate BTP on a bottom transfer turret BTT adjacent to the anvil roll BAD and indexed therewith to pick up each bottom disc BD as it is cut.

The bottom transfer plate BTP bearing the bottom disc BD is eventually indexed into registry with a passing finishing mandrel FM (FM1) and transferred thereto.

The initial pick up of the bottom disc BD by the transfer plate BTP is made by vacuum applied via a vacuum port BTV through vacuum distributors BVD1 and BVD2.

The distributor BVD1 rotates with the bottom transfer plates BTP on the turret BTT while the distributor BVD2 remains stationary.

Vacuum is supplied through a vacuum hose BVH from a vacuum supply source BVS in the base of the turret BTT. The fitting of the hose BVH to the fixed distributor BVD2 acts as a valve to provide vacuum to the ports BTV at all locations via the distributors BVD1, BVD2 except at the right hand position shown in FIG. 12 for the bottom transfer plates BTP. In this position, there is no vacuum in the line BTV and the vacuum from the hose VH in the finishing mandrel FM, now coaxially indexed with the bottom transfer plate BTP will act to strip the bottom disc BD from the plate BTP and onto the base of the mandrel FM.

IN-LINE FILLING OF CONTAINERS AS THEY ARE MADE

As the finished containers 100 enter the magazine MAG at the ejection station TES of the top curl turret TCT, the containers can be fed, one by one, as known in the art to dial-like feeder discs 104 which are indexed by a shaft 106 to feed the containers 100, one-by-one to a container filling station 110 where food product 112 in a measured amount is discharged into the container 100. The container 100 is elevated by a pedestal 108 to the filling station 100, which pedestal withdraws to return the container to rest in the dial 104 on its top curl 102.

The container 100 with food 112 is then transferred to another station where a lid 114 is pressed onto the top curl 102 of the container 100 by a seating jib 116 as will now be described with reference to FIG. 14.

The jig 116 is provided with an ejection plunger 118 to eject the lid and container from the jig 116 after seating is completed. An air gap 120 is maintained between the plunger 118 and the lid 114 in the event that vacuum is needed to initially retain the lid 114 in the jig 116.

A plurality of shaped pressure rollers 122 such as schematically illustrated, are spaced around the top curl 102 and produce a curved seam 114R between the top curl 102 and the lid 114.

A pedestal 108A is utilized to transfer the filled container 100 from the dial 104 to the lid seating jig 116.

In an alternate embodiment for seating a lid 114A on a container 100A, having an uncurled top edge 102A, a top edge overlap 114RA on the lid 114A is clinched in place by segmented jaws 124 in cooperation with a seating jig 116A. This embodiment is shown schematically in FIG. 15.

Figures 13, 14, 15:
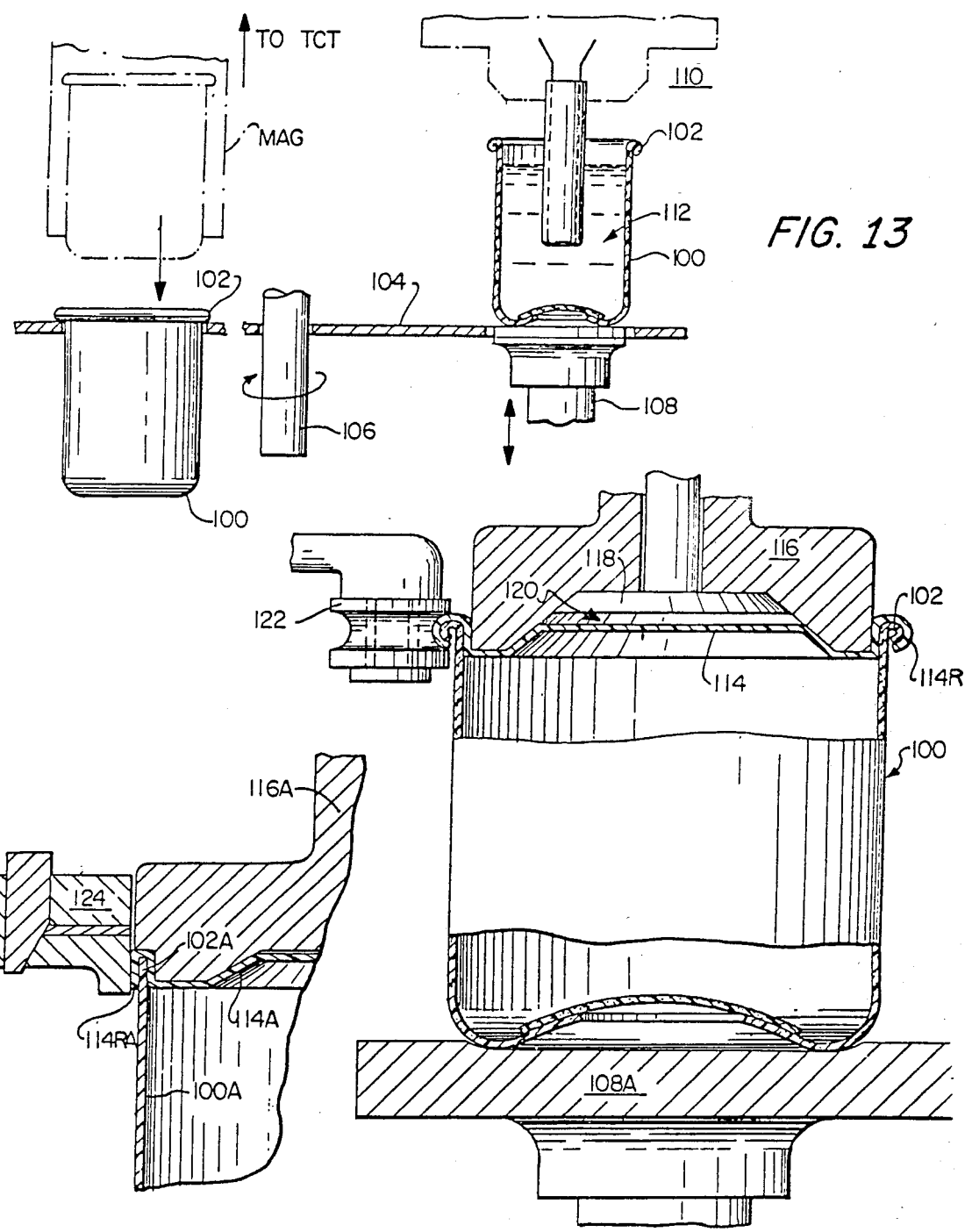
FIG. 13 is a schematic of a container filling station.
FIg. 14 is a schematic of a filled container capping station.
FIG. 15 is a schematic of a filled container capping station illustrating a different cap or lid from that illustrated in FIG. 14.

Rotary transfer dials 104 and pedestals 108 and filling stations 110 such as those shown in FIG. 13 are known in the art.

For example, U.S. Pat. No. 3,225,899 for Machine For Packaging Food Products of J. B. West, issued Dec. 28, 1965 and U.S. Pat. No. B 3,345,801 for Auxiliary Unit For Packaging Machine to J. B. West, issued Oct. 10, 1967 illustrate container filling, capping and handling machines of the type generally described with reference to FIGS. 13, 14 and 15.

With the present invention, cans and containers can be made as needed and no storage of completed containers is necessary in conjunction with a given canning or packaging run.

Only rolls of sidewall and bottom blank material need be stored to effect a supply of containers for holding a given volume of food product.

This also permits the use of non-nestable container shapes which heretofore have been undesirable because of their bulk in an unfilled condition. Once filled, of course, even nestable containers assume such bulk in storage.

Thus, with the continuous container manufacturing method and means of FIGS. 1–12, feeding the continuous filling and capping equipment typified by FIGS. 13–15, an extremely efficient operation is provided which requires only a minimum of warehouse space for the containers required.

SUMMARY OF CONTAINER MAKING OPERATION

As illustrated in FIGS. 1–3, foam plastic strip stock, stretch oriented on its length 10B, is cut into rectangular blanks 10A and transferred transversely of its length 10B through continuous folding means M, H1, H2, FR1, FR2 and a heat seaming means PB to form seamed cylinders 10C circumferentially stretch oriented.

The cylinders 10C are placed over finishing mandrels FM (FM1) having bottom blanks BD already in place from a bottom transfer turret BTT (FIGS. 9, 12).

A chain drive 46 (FIGS. 1, 3, 7, 9) carries the mandrels FM (FM1) through a heat shrink tunnel causing the cylinders 10C to shrink and assume the shape of the mandrels FM (FM1) as shown in FIGS. 6A/6B). The sidewalls SW1 (SW2) shrink beneath the mandrels FM (FM1) to place annular overlapping portions SW1A (SW2A) over the outer edges of the bottom disc BD (BD1) as further shown in FIG. 6A (6B).

As the mandrels FM (FM1) bearing shrink formed containers 100 leave the heat tunnel HT (FIGS. 7, 9, 10, 11) bottom seams are formed in the overlap by bottom irons BI on a bottom ironing turret BIT in a manner most specifically illustrated in FIGS. 11A, 11B.

The top curl 102 is then formed on the containers 100 by discharging them from the mandrels FM (FM1) into the receiving chambers TRC of the top curl forming turret TCT which, as shown in FIG. 10A, places a top curl 102 in each container 100 with top curl tool TC.

Subsequent to the forming of the top curl 102, the container 100 is ejected from the top curl turret TCT at an ejection station TES, inverted to proceed bottom first into a magazine MAG and thus placed in readiness for either packaging or for processing in filling equipment.

FIGS. 16A through 19 illustrate an alternate embodiment for handling a stretch oriented rectangular blank and forming the blank into a cylinder. This alternate embodiment of the present invention may be readily utilized in combination with the blank handling, cylinder forming and cylinder transferring mechanism illustrated in FIGS. 1 through 15.

Figure 16C:
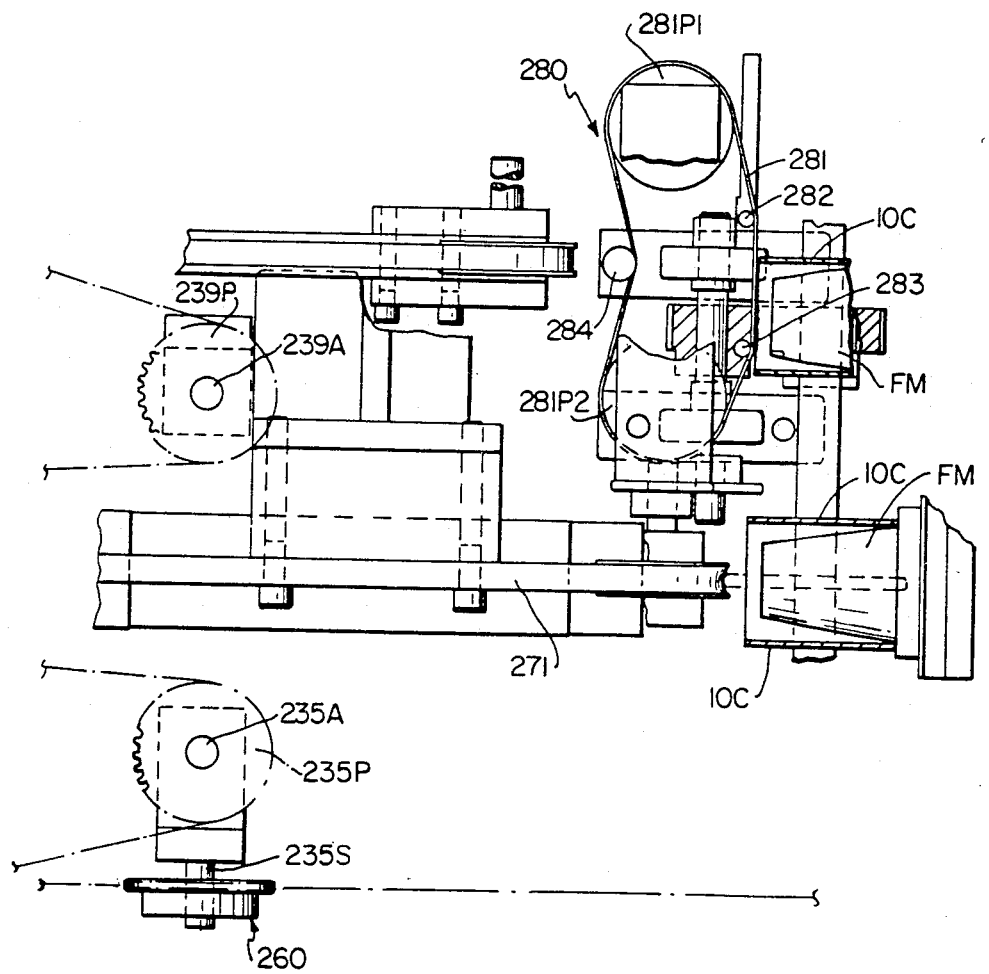
FIG. 16C is a continuation of a blank handling and cylinder forming mechanism as illustrated in FIGS. 16A and 16B and further illustrating the cylinder seating mechanism.

FIGS. 16A through 16C illustrate a top plan view of the alternate embodiment blank handling and cylinder forming mechanism of the present invention. FIG. 16A illustrates a top plan view of the left hand portion of the alternate embodiment. The rectangular blank 10A is fed on its longitudinal axis by the drive belt DB2 to a right angle transfer point TP2. The blank 10A is properly positioned at the transfer point TP2 by means of the limit stop LS2. After the blank 10A is properly positioned, it is ready to be laterally transferred in a direction 90° to its original path.

As illustrated in FIGS. 16A through 16C, a tubular forming mandrel M2 extends from the transfer point TP2 to the point where the formed cylinders 10C are transferred to a final forming mandrel FM. As shown in FIG. 16A, when the blank 10A is positioned beneath the tubular forming mandrel M2 it is engaged by the outboard chain pusher dogs 201D and 202D and by the blank pusher dog 210D. The outboard chain pusher dog 201D is connected to the outboard chain 201. Similarly, the outboard chain pusher dog 202D is connected to the outboard chain 202. The two outboard chains are guiding and stabilizing means which engage the blank 10A at the transfer point TP2 and remain in contact therewith until the blank has reached the pre-fold rails 220.

Figure 17A:
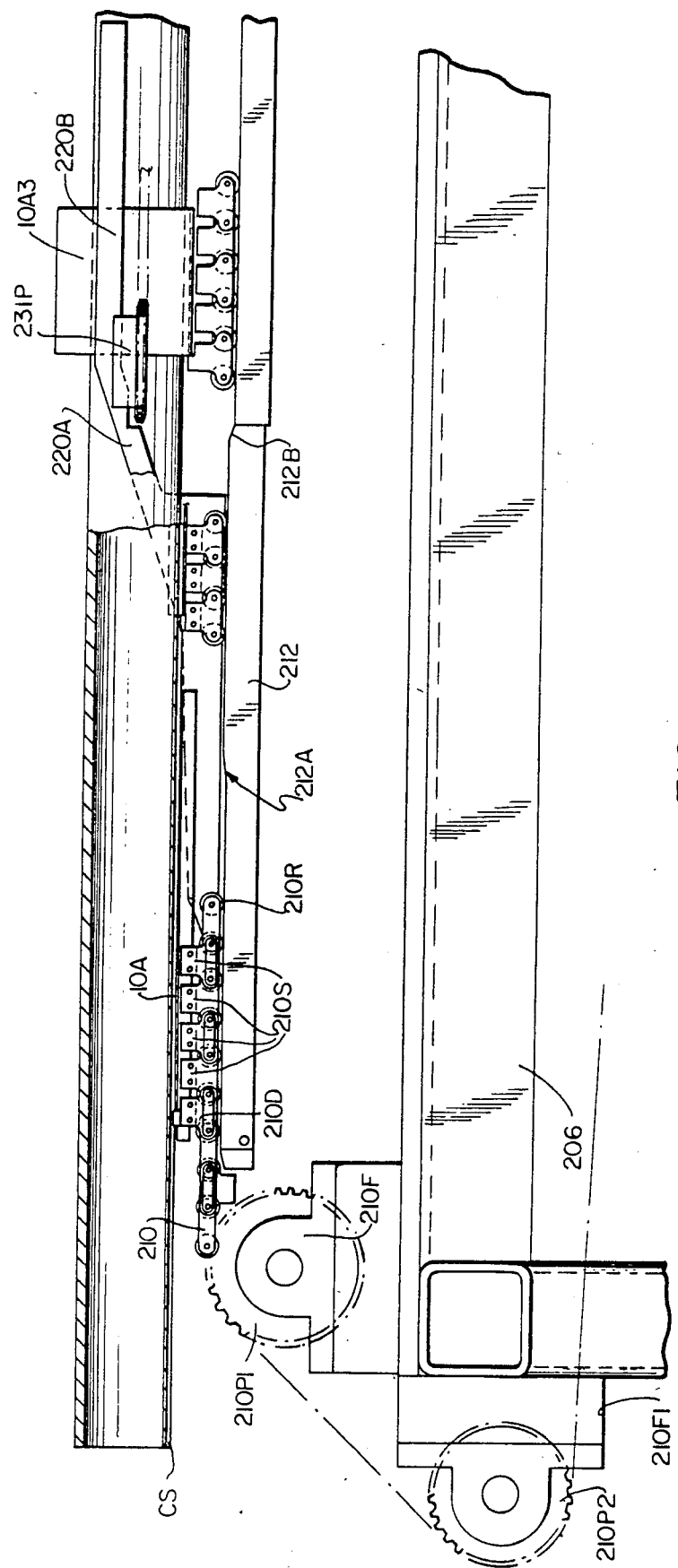
FIG. 17A is a side elevation of the blank handling and cylinder forming mechanism as illustrated in FIG. 16A.
Figure 17B:
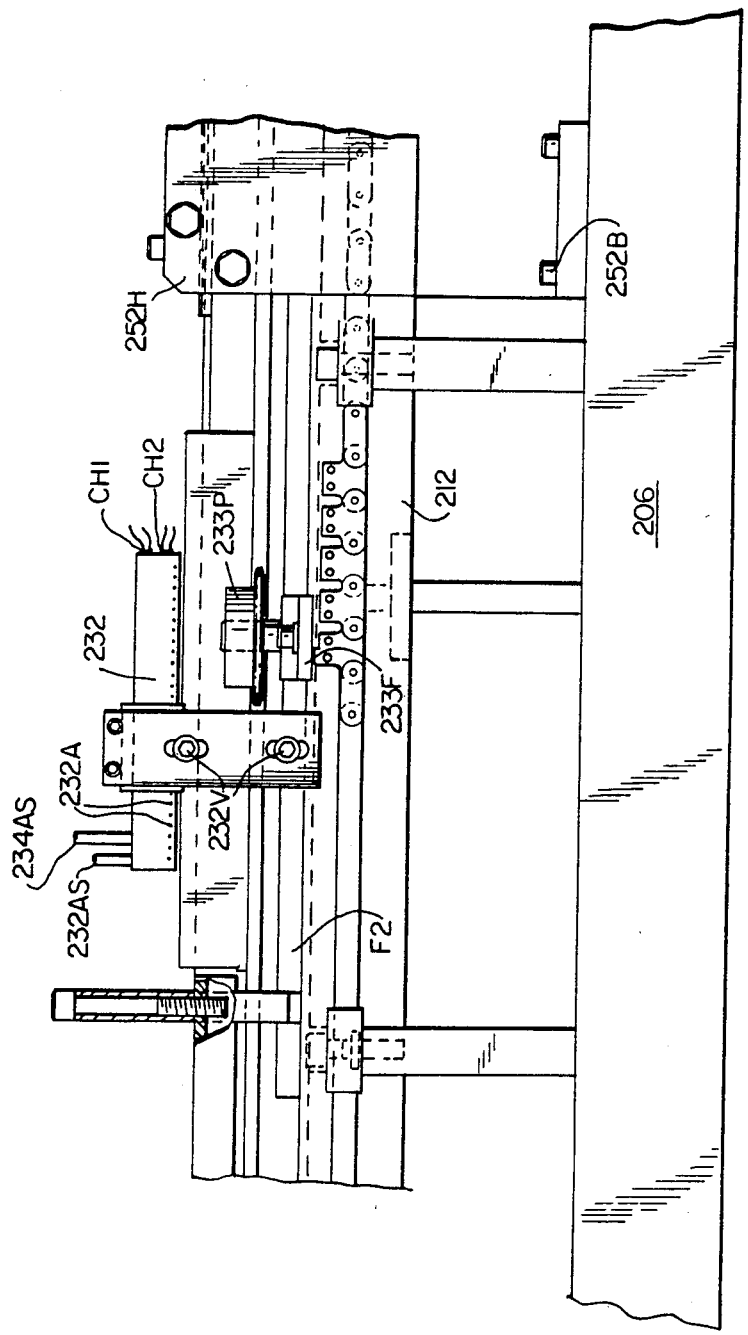
FIG. 17B is a side elevation of the blank handling and cylinder forming mechanism as illustrated in FIG. 16B and further illustrating the cylinder heater.
Figure 17C:
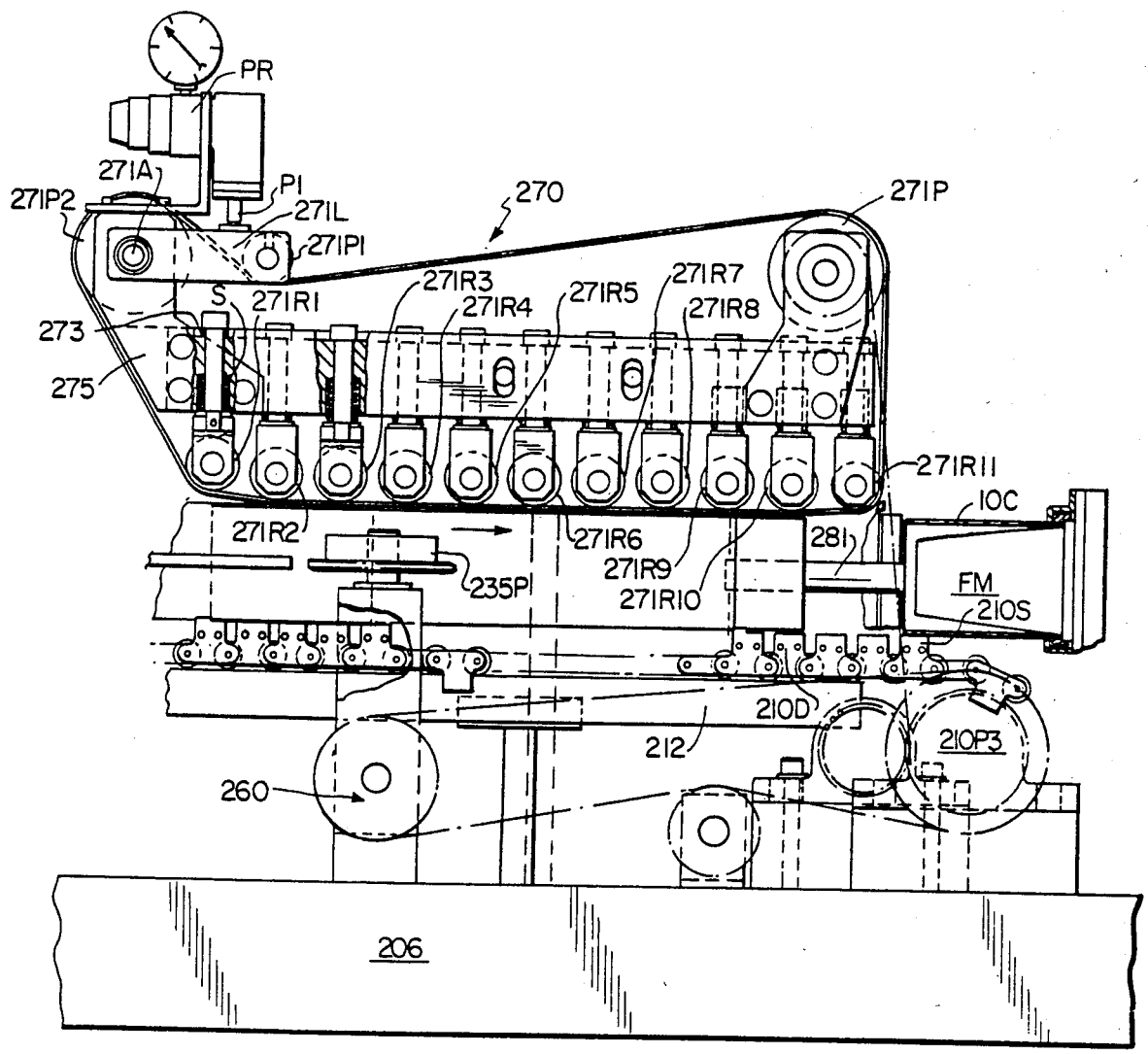
FIG. 17C is a side elevation of the blank handling and cylinder forming mechanism as illustrated in FIG. 16C and further illustrating the seamer assembly.

The blank pusher chain 210 extends the entire length of the tubular forming mandrel M2. The blank pusher dog 210D project upwardly into a clearance slot which is formed on the underside of the tubular forming mandrel M2. As the blank 10A is positioned at the transfer point TP2, three pusher dogs 201D, 202D and 210D engage the blank and transfer it at an angle of 90° from its original path. Referring to FIGS. 17A through 17C the blank pusher chain 210 includes groups of four blank support dogs 210S together with one blank pusher dog 210D. At the transfer point TP2, the four blank support dogs 210S are positioned beneath the blank 10A. Therefore, the blank 10A is permitted to pass over the four blank support dogs 210S. This positioning if is effected by the relationship between the blank pusher chain rollers 210R and the support bar 212.

The combination of the three chain pusher dogs 210D, 202D and 210D together with the long rubber covered roll R, the transfer plate TP, the four blank support dogs 210S and a plexiglass cover sheet PS prevent the blank 10A from skewing as it moves from the transfer point TP2 towards the pre-fold rails 220. The plexiglass cover sheet PS covers the area adjacent the initial pusher dog contact and blank movement. The plexiglass cover sheet includes a "V" shaped notch which is machined in the outfeed end of the plate. With reference to FIG. 16A, as a blank 10A moves beneath the plexiglass sheet PS, the last portion of the blank to be released will be the two trailing tips.

Referring to FIG. 17A, as the two trailing tips of the blank 10A are released by the plexiglass sheet PS, the blank pusher chain rollers 210R travel up an incline 212A on the support bar 212. Correspondingly, this increases the elevation of the four blank support dogs 210S which in turn push the blank 10A into contact with the tubular forming mandrel M2. In addition, the increase in elevation causes the blank pusher dog 210D to further project upwardly into the clearance slot CS on the underside of the tubular forming mandrel M2. Therefore, the blank 10A is clamped to the tubular forming mandrel M2 as it travels towards the outfeed end of the tubular forming mandrel.

After the blank 10A is clamped by the blank pusher dog 210D, the blank engages the stationary pre-fold rails 220 and lose contact with the outboard chain pusher dogs 201D and 202D. The stationary pre-fold rails 220 include a lifting portion 220A and a substantially horizontal guiding portion 220B. As the blank 10A engages the lifting portion of the pre-fold rails, the blank is folded against the bottom half of the forming mandrel into a vertical "U" shaped configuration.

As illustrated in FIGS. 16A and 17A, as the blank 10A is folded into a vertical "U" shaped configuration 10A3 the back side edges of the blank are contacted by two side guide pusher dogs 230D. The side guide pusher dogs 230D are connected to side guide chains 230. Further, the side guide chains 230 include blank support dogs 230S. The two side guide chains provide stability to maintain the top edges of the blank 10A3 parallel during transporation in the 50% folded position to the side seam heaters. As soon as the side guide chain dogs 230D engage the blank 10A3, the blank pusher chain rollers 210R travel down an incline 212B. Thus, the clamping effect of the four blank support dogs 210S against the tubular forming mandrel M2 is released permitting the side guide chain dogs 230D to square up the blank 10A3 prior to the heat sealing operation.

FIGS. 16B and 17B illustrate the position of the side seam heaters. The blank handling and cylinder forming mechanism of the alternate embodiment of the present invention includes two side seam heaters 232 and 234. Each side seam heater comprises a long metal block and includes at least one cartridge heater positioned therein.

Referring to FIG. 17B, the side seam heater 232 includes two cartridge heaters CH1 and CH2. A compressed air supply 232AS is in communication with a plurality of small holes 232A positioned along the side of the side seam heater 232. As the cartridge heaters CH1 and CH2 increase the temperature of the side seam heater, the compressed air supplied thereto is heated. The side seam heater 234 is similar in construction to the side seam heater 232 and is connected to a compressed air supply by means of the conduit 234AS.

Both side seam heaters 232 and 234 are mounted to the blank handling and cylinder forming mechanism so as to be readily removable therefrom. Each side seam heater can be adjusted both vertically and horizontally. The vertical adjustment would be effected by loosening the bolts 232V, adjusting the vertical height of the side seam heater 232 and then tightening the bolt 232V to affix the side seam heater to the framework F2. Similarly, the side seam heater 234 may be adjusted vertically by means of the bolts 234V.

It is extremely important that the side seam heaters be adjustably mounted adjacent the blank handling and cylinder forming mechanism. If a blank jams as it passes along the tubular forming mandrel, it may be necessary to remove the side seam heaters to gain access to the jammed blank.

The 50% folded blank 10A3 is transported along the tubular forming mandrel M2 by means of the blank pusher dog 210D and the two side guide chain dogs 230D. The upwardly projecting sides of the blank 10A3 are vertical and do not contact the side seam heaters 232 and 234. As previously discussed, compressed air is heated and blown through a series of small diameter holes in the side seam heaters 232 and 234. With reference to FIG. 18, the heated compressed air strikes the left hand outside portion and the right-hand inside edge of the blank 10A3. Individual temperature control of the two side seam heaters is desirable since different temperatures may be required for each side for proper softening prior to seaming.

As upwardly projecting sides of the blank 10A3 are heated by the compressed air, the natural reaction is for both sides of the blank to move away from their previously parallel condition. Since the right-hand side of the blank moves away from the side seam heater 232, it may be necessary that the temperature of the side seam heater 232 be greater than the temperature of the side seam heater 234. Correspondingly, since the left-hand side of the blank has a tendency to move closer to the side seam heater 234, the temperature of the side seam heater 234 may be less than the temperature of the side seam heater 232. Temperature requirements of the side seam heaters 232 and 234 will vary depending on the quality of the foam of the blank. Further, depending on the quality of the foam of the blank it may be necessary to evenly apply heat to both the right-hand side and left-hand side of the blank.

After the 50% folded blank 10A3 is heated by means of the side seam heaters 232 and 234, it is transported towards the outfeed end of the tubular forming mandrel M2 by means of the blank pusher dog 210D and the two side guide pusher dogs 230D. The upwardly projecting heated left-hand side of the blank initially contacts the intermediate folding guide 244. Subsequently, the upwardly projecting heated right-hand side of the blank engages the intermediate folding guide 242. The intermediate guides 244 and 242 shape the substantially U-shaped blank into a substantially cylindrical form. Subsequently, the substantially cylindrical blank engages the final folding guides 254 and 252. The final folding guides position the right-hand side of the blank on top of the left-hand side of the blank in an overlapping arrangement. Note, with reference to FIG. 19, which is a cross-sectional view from the outfeed end of the tubular forming mandrel M2, the right and left-hand sides of the blank are interposed.

Referring to FIGS. 16B and 17B, the final folding guides 254 and 252 are shown to be adjustably mounted relative to the tubular forming mandrel M2. The final folding guides include two adjustable, spring-loaded bars GB1 and GB2 positioned on each side of the lower portion of the tubular forming mandrel M2. The two lower guide bars GB1 and GB2 are positioned at 45° from the vertical center line of the tubular forming mandrel and are normal to the mandrel diameter. The two lower guide bars hold the blank against the mandrel to ensure a tight final fold. The two lower guides bars GB1 and GB2 including springs GBS1 and GBS2 are shown schematically in FIG. 19.

The final folding guides include two adjustable, spring-loaded bars which are positioned on each side of the upper portion of the tubular forming mandrel. The upper guides, or intermediate guide rails 242 and 244, initiate the final fold which is completed by two adjustable, spring-loaded guides 252 and 254. The two final folding guides are positioned on each side and near the top center of the tubular forming mandrel M2. As shown in FIG. 16B, the intermediate forming guides 242 and 244 are adjustably mounted adjacent the upper portion of the tubular forming mandrel. Further, the spring 252S and 254S adjustably position the final forming guides 252 and 254, respectively, adjacent the top center of the tubular forming mandrel.

The final forming guides may be formed of steel or Teflon or may be intermixed so that one is formed of steel and the other of Teflon. Further, the final forming guides 252 and 254 are supported by housings 252H and 254H, respectively. The housings 252H and 254H are connected to the framework F2 and further bolted to the undercarriage 206. As shown in FIG. 17B, the housing 252H is bolted to the undercarriage 206 by means of bolts 252B.

As previously discussed, the blank 10A is transported almost the entire length of the tubular forming mandrel M2 by means of the blank pusher dog 210D. The blank pusher dog chain 210 is rotatably supported by a plurality of pulleys 210P1, 210P2, and 210P3. Additional pulleys to guide the blank pusher chain 210 may be provided, but are not shown in the drawings. The pulley 210P1 is supported by a frame member 210F which is connected to the undercarriage 206. Further, the pulley 210P2 may be supported by a frame member 210F1 which is also connected to the undercarriage 206. Correspondingly, the outboard chain 201 is supported by the pulleys 201P1 and 201P2 to rotatably support the outboard chain 201 in the vicinity of the transfer point TP2. Further, the outboard chain 202 is supported by the pulleys 202P1 and 202P2 to rotatably support the chain 202 in the vicinity of the transfer point TP2.

After the blank is folded into a "U" shape, the blank pusher dog 210D continues to transport the blank along the tubular-forming mandrel M2 and is supplemented by the side guide chain dogs 230D. The right-hand side guide chain 230 is rotatably supported by a plurality of pulleys 231P, 233P, and 235P. Correspondingly, the left-hand side guide chain 230 is rotatably supported by a plurality of pulleys 236P, 238P, and 239P. All of the side guide chain pulleys are fixed to the framework F2 which is secured to the undercarriage 206.

The side guide pulley 233P is rotatably mounted on an axle 233A. The axle 233A is mounted on a frame member 233F which is bolted to the framework F2 by means of the bolt 233B. Correspondingly, the side guide chain pulley 238P is mounted on an axle 238A. The axle 238A is supported by a frame member 238F. The frame member is bolted to the framework by means of a bolt 238B.

The side guide chain pulley 235P is mounted on an axle 235A. The axle 235A is geared to a shaft 235S which is rotatably driven by a pulley drive system 260. Motion imparted to the pulley drive system 260 is transmitted to the axle 235A and correspondingly rotates the right-hand side guide chain 230. Similarly, the left-hand side guide chain 230 is geared to the pulley drive system 260.

Figure 19:
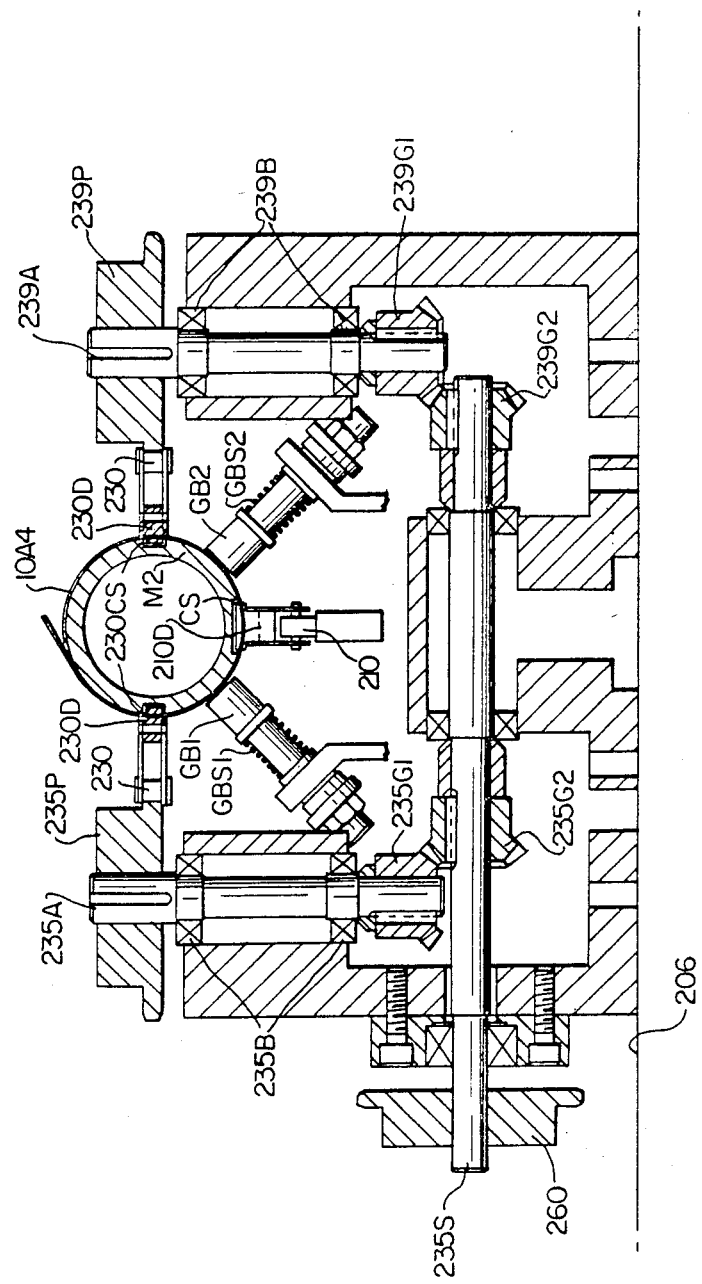
FIG. 19 is a cross-sectional view of a blank handling and cylinder forming mechanism shown in FIGS. 16A through 16C illustrating the position of a blank prior to being engaged by the seamer assembly as viewed from the outfeed end of the tubular forming mandrel.

FIG. 19 illustrates a cross-sectional view of the blank handling and cylinder forming mechanism of the alternate embodiment of the present invention prior to the blank 10A4 engaging the seamer assembly 270. FIG. 19 represents a cross-sectional view taken from the outfeed end of the blank handling and cylinder forming mechanism. Therefore, elements which were previously referred to as the left-hand and right-hand members are interposed. Thus, the left-hand side guide chain 230, as shown in FIG. 19, was previously described as the right-hand side guide chain 230. Correspondingly, the right-hand side guide chain 230, as shown in FIG. 19, was previously described as the left-hand side guide chain 230.

As discussed above, the drive pulley 260 is connected to a shaft 235S which includes two gear members 235G2 and 239G2. The gear members 235G2 and 239G2 are meshed with gear members 235G1 and 239G1, respectively. In addition, the axles 235A and 239A are supported within the frame member by means of bearings 235B and 239B, respectively. The framework supporting the pulley drive system is secured to the undercarriage 206.

The substantially cylindrical blank 10A4 is transferred along the tubular forming mandrel M2 and is engaged by the seamer assembly 270. The seamer assembly 270 includes an endless belt 271 which is rotatably supported by a plurality of pulleys 271P, 271P1, and 271P2 and a plurality of spring-loaded rollers 271R1 through 271R11. As shown in FIG. 17C, as the substantially cylindrical blank is transported towards the outfeed end of the tubular forming mandrel M2, the blank exits from the final folding assembly and is engaged by the endless seaming belt 271. The blank passes beneath the first spring-loaded roller 271R1 and is engaged by the ten subsequent spring-loaded rollers 271R2 through 271R11. Once the entire cylindrical blank length has been engaged by the second spring-loaded roller 271R2, the left-hand edge and the right-hand edge of the cylinder blank will be seamed together. After the seam is accomplished, the side guide chain dogs 230D will disengage from the cylinder blank. Further, at this point, the inside diameter of the cylinder is equal to the outside diameter of the tubular forming mandrel M2.

The velocity of the belt 271 is approximately 20% faster than the velocity of the blank pusher chain 210. Therefore, the cylindrical blank is accelerated ahead of the blank pusher dog 210D. At this point, the cylinder blank is propelled solely by the seamer belt 271. In order to facilitate the movement of the cylinder blank, the outside diameter of the forming mandrel F2 may be reduced. Further, the velocity of the seamer belt 271 produces enough momentum to place the cylinder blank on the final forming mandrel FM. As shown in FIG. 17C, as the cylinder blank moves from the forming mandrel to the final forming mandrel FM, the trailing edge of the cylinder blank is supported by the four blank support dogs 210S.

Tension is applied to the seaming belt 271 by means of the pulley 271P1 which is biased about the axle 271A. As shown in FIG. 17C, pressure is supplied to the pin P1 which is in engagement with a lever 271L. As the pressure applied to the pen P1 is increased, the lever 271L is biased downwardly thereby applying tension to the seamer belt 271. It is important to adjust the tension of the seamer belt 271 to control the slippage and the driving force imparted to the cylinder blank. Air pressure may be supplied to the pin P1 through the pressure regulator PR.

Each of the spring-loaded rollers 271R1 through 271R11 are mounted on a shaft which is supported in the housing 275. The first roller, 271R1, is spaced upwardly by means of a spacer 273. The spacing of the first spring-loaded roller above the plane of the remaining ten spring-loaded rollers ensures accurate contact of the seamer belt 271 with the cylinder blank. All of the spring-loaded rollers include a biasing spring S.

As illustrated in FIG. 16C, adjacent the outfeed end of the tubular forming mandrel M2 is positioned a cylinder seating mechanism 280. The cylinder seating mechanism 280 includes a cylinder seating belt 281 which is rotatably supported on a plurality of pulleys 281P1 and 281P2. The path of the cylinder seating belt 281 is guided by a plurality of upwardly projecting pins 282, 283, and 284.

As discussed above, the velocity of the seamer belt 271 produces the momentum required to position the cylinder blank 10C on the final forming mandrel FM. The cylinder seating belt 281 ensures that the cylinder blank 10C is properly mated with the final forming mandrel FM.

As the cylinder blank 10C positioned on the final forming mandrel FM is transported adjacent the cylinder seating belt 281, the cylinder blank 10C is firmly positioned on the final forming mandrel FM. It is preferred that the velocity of the cylinder seating belt 281 be greater than the velocity of the cylinder blank 10C positioned on the final forming mandrel FM. Further, the pins 282-284 which guide the cylinder seating belts 281 may include rollers which will reduce the friction therebetween.

OPERATION OF THE ALTERNATE EMBODIMENT

As a blank 10A is transferred from the blank cutter to the transfer point TP2 by means of the drive belt DB2, the trailing edge of the blank is engaged by the pusher dogs 201D, 202D and 210D. Subsequently, the blank 10A is transferred at an angle of 90° to its original path.

The combination of the three pusher dogs, the limit stop LS2, the long rubber covered roll R, the transfer platform TP and the plexiglass sheet PS prevent the blank 10A from skewing as it is transported towards the prefold rails 220. The plexiglass sheet PS is machined to include a "V" shaped notch in the outfeed end thereof. As a blank 10A is transferred along the tubular forming mandrel M2, the notch in the plexiglass sheet retains the two trailing tips of the blank. At the same instant the trailing tips of the blank are released by the plexiglass sheet PS, the blank pusher chain rollers 201R travel up an incline 212A on the support bar 212. The increase in elevation of the blank pusher chain rollers 210R correspondingly elevate the four blank support dogs 210S and the blank pusher dog 210D thereby clamping the blank 10A against the bottom portion of the tubular forming mandrel M2. After clamping the blank 10A adjacent the tubular forming mandrel M2, the outboard chain dogs 201D and 202D disengage from the trailing edge of the blank 10A.

As the blank engages the stationary pre-fold rails 220A, the edges of the blank are folded against the bottom portion of the tubular forming mandrel M2. As the blank is formed into a vertical "U" shaped configuration, the trailing edges of the blank are contacted by two side guide chain dogs 230D. At the same instant that the side guide chain dogs 230D contact the 50% folded blank 10A3, the blank pusher chain rollers 210R travel down an incline 212B and thereby releasing the clamping effect on the blank. The two side chain support dogs provide stability to retain the top edges of the blank parallel as the blank is transported in its 50% folded position. Further, as the clamping effect is released from the blank, the side guide chain dogs square up the blank prior to the heat sealing operation.

As the 50% folded blank 10A3 is transported along the tubular forming mandrel M2 by means of the blank pusher dog 210D and the side guide chain dogs 230D, the upwardly projecting edges are heated by the side seam heaters 232 and 234. Viewing the blank handling and cylinder mechanism of the alternate embodiment from the infeed end, compressed air blown though a series of small diameter holes in the side seam heater 232 will strike the right-hand inside edge of the blank 10A3. Correspondingly, heated compressed air blown though a series of small diameter holes in the side seam heater 234 will strike the left-hand outside edge of the blank 10A3.

As the heated blank is transported along the tubular forming mandrel M2, the left-hand edge of the blank will engage the intermediate side 244 and will be folded adjacent the upper portion of the tubular forming mandrel. Subsequently, the right-hand edge of the blank 10A3 will engage the intermediate guide 242 and be folded towards the upper portion of the tubular mandrel. As the transportation of the blank continues, the folded edges of the blank will engage the final folding guides 252 and 254 to position the edges of the blank adjacent the top center of the tubular forming mandrel. The left-hand edge of the blank will underlie the right-hand edge of the blank and will be ready to be engaged by the endless seamer belt 271.

Once the entire cylinder blank link has passed under the second roller of the seamer belt assembly, the seam is completed and the side guide chain dogs 230D disengage from the trailing edge of the blank. At this point, the inside diameter of the cylinder blank is equal to the outside diameter of the forming mandrel. The seamer belt velocity is approximately 20% faster than the blank pusher chain dog 210D. Therefore, the cylindrical blank is accelerated ahead of the pusher chain dog. As this occurs, the seamer belt 271 becomes the sole means of propelling the cylinder blank. In order to facilitate movement of the cylinder blank, the outside diameter of the tubular forming mandrel may be reduced.

The velocity of the seamer belt 271 produces the momentum required to position the cylinder blank 10C on the final forming mandrel FM. As the cylinder blank is transported from the tubular forming mandrel M2 to the final forming mandrel FM, the trailing edge of the cylinder blank is supported by the four blank support dogs. Subsequently, the cylinder blank 10C positioned on the final forming mandrel FM is transported adjacent the cylinder seating belt 281. The cylinder seating belt 281 is designed to ensure proper seating of the cylinder blank 10C on the final forming mandrel FM.

After the cylinder blank 10C is properly positioned, the final forming mandrel is transported through a heat tunnel and subsequently the formed container is discharged from the final forming mandrel. The discharging of the finished container from the final forming mandrel is adequately discussed with reference to FIGS. 1 through 15. Further, although FIGS. 16C and 17C illustrate a frusto-conical final forming mandrel FM, a cylindrical final forming mandrel FM1 may be utilized in the alternate embodiment of the present invention.

Referring in detail to FIG. 18, there is illustrated the various positions of the rectangular blank 10A as it is formed from a flat sheet into a vertical "U" shaped configuration 10A3. The tubular forming mandrel M2 is shown to include a clearance slot CS into which the upwardly projecting blank pusher dog 210D projects. As previously discussed, the blank pusher dog 210D is driven along the length of the tubular forming mandrel M2 by means of a drive chain 210.

The tubular forming mandrel M2 is supported above the undercarriage 206 by the support frame 40A. As shown in FIG. 18, the tubular forming mandrel M2 is affixed to the frame 40A by means of a bolt 40B. Additional supports may be provided along the length of the tubular forming mandrel to ensure its relative position with respect to the undercarriage 206. Further, as illustrated in FIG. 18, the undercarriage 206 supports a plurality of driving gears and pulleys which are utilized to supply power to the various drive chains and other working members of the blank handling and cylinder forming mechanism of the present invention.

As previously stated, FIG. 19 represents a cross-sectional view of the blank handling and cylinder forming mechanism of the present invention as viewed from the outfeed end of the tubular forming mandrel M2. It is important to note, that the side guide chain dogs 230D project inwardly into clearance slots 230CS in the tubular forming mandrel M2. As clearly illustrated in FIG. 19, the inward projection of the side guide chain dogs and the blank pusher dog into the various clearance slots provided in the tubular forming mandrel M2 ensures the positive transportation of the rectangular blank. Each of the pusher dogs utilized to transport the rectangular blanks engage the blank with a large surface area because they project into the corresponding clearance slots in the tubular forming mandrel M2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An apparatus for forming a cylindrical blank from a rectangular blank of foam sheet material comprising:
- a delivery means for supplying a rectangular blank including two transverse edges and two parallel edges to a rectangular blank infeed point;
- a transfer means for receiving and positioning said rectangular blank at said infeed point;
- a mandrel means for forming a cylindrical blank positioned adjacent the transfer receiving means and extending from said rectangular blank infeed point to a cylindrical blank discharge point;
- a conveyor means for transporting said rectangular blank along said mandrel means in a direction parallel to said parallel edges of said rectangular blank;
- a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;
- a heating means for applying heat to said parallel edges of said rectangular blank;
- a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel;
- a seating means for engaging said cylindrical blank positioned on a final forming mandrel to ensure proper positioning thereof; and
- said final forming mandrel is transported along a path and said seating means includes an endless belt positioned adjacent said path for engaging said cylindrical blank positioned on a final forming mandrel.

2. An apparatus for forming a cylindrical blank from a rectangular blank of foam sheet material comprising:
- a delivery means for supplying a rectangular blank including two transverse edges and two parallel edges to a rectangular blank infeed point;
- a transfer means for receiving and positioning said rectangular blank at said infeed point;
- said transfer means includes a lower transfer plate, a limit stop and an upper guide sheet to prevent the skewing of said rectangular blank as it is transported from said infeed point;
- a mandrel means for forming a cylindrical blank positioned adjacent the transfer receiving means and extending from said rectangular blank infeed point to a cylindrical blank discharge point;
- a conveyor means for transporting said rectangular blank along said mandrel means in a direction parallel to said parallel edges of said rectangular blank;
- a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;
- a heating means for applying heat to said parallel edges of said rectangular blank;
- a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel; and
- a seating means for engaging said cylindrical blank positioned on a final forming mandrel to ensure proper positioning thereof.

3. An apparatus for forming a cylindrical blank from a rectangular blank of foam sheet material comprising:
- a delivery means for supplying a rectangular blank including two transverse edges and two parallel edges to a rectangular blank infeed point;
- a transfer means for receiving and positioning said rectangular blank at said infeed point;
- an elongated tubular member for forming a cylindrical blank positioned adjacent the transfer receiving means and extending from said rectangular blank infeed point to a cylindrical blank discharge point;
- a conveyor means for transporting said rectangular blank along said elongated tubular member in a direction parallel to said parallel edges of said rectangular blank;
- a folding means for shaping said rectangular blank positioned adjacent said elongated tubular member, said folding means progressively folding said rectangular blank around said elongated tubular member from said infeed point to said discharge point to overlap said parallel edges of said rectangular blank on said elongated tubular member to form a cylindrical blank;
- a heating means for applying heat to said parallel edges of said rectangular blank;
- a seaming means for applying pressure to said heated parallel edges of said cylindrical blank to affix said parallel edges of said cylindrical blank together and transporting said cylindrical blank along said elongated tubular member, out of engagement with said conveyor means at a reduced diameter portion of said elongated tubular member and producing the momentum necessary to position said cylindrical blank on a final forming elongated tubular member; and
- a seating means for engaging said cylindrical blank positioned on a final forming mandrel to ensure proper positioning thereof.

4. An apparatus according to claim 3, wherein said elongated tubular member includes at least one clearance slot adapted to receive a portion of said conveyor means to guide said conveyor means as it transports said rectangular blank from said infeed point to said discharge point.

5. An apparatus for forming a cylindrical blank from a rectangular blank of foam sheet material comprising:
- a delivery means for supplying a rectangular blank including two transverse edges and two parallel edges to a rectangular blank infeed point;
- a transfer means for receiving and positioning said rectangular blank at said infeed point;

a mandrel means for forming a cylindrical blank positioned adjacent the transfer receiving means and extending from said rectangular blank infeed point to a cylindrical blank discharge point;

a conveyor means for transporting said rectangular blank along said mandrel means in a direction parallel to said parallel edges of said rectangular blank;

said conveyor means includes at least one chain and at least one upwardly projecting blank pusher dog for transporting said blank along said mandrel means;

a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;

a heating means for applying heat to said parallel edges of said rectangular blank;

a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel; and a seating means for engaging said cylindrical blank positioned on a final forming mandrel to ensure proper positioning thereof.

6. An apparatus according to claim 5, wherein said blank pusher dog is positioned adjacent a blank support dog which in combination transport said blank along said mandrel means.

7. An apparatus according to claim 6, wherein said chain is guided along a path from a position below said infeed point to an elevated position in which said blank supported on said blank support dog engages said mandrel means to ensure accurate initial folding of said blank by said folding means.

8. An apparatus according to claim 7, wherein after said initial folding said chain is guided away from said mandrel means and the trailing edges of said blank are engaged by at least one side guide chain.

9. An apparatus according to claim 8, wherein said side guide chain includes at least one side guide pusher dog positioned adjacent a side guide support dog to assist the transportation of said blank along said mandrel means.

10. An apparatus for forming a cylindrical blank from a rectangular blank of foam sheet material comprising:
a delivery means for supplying a rectangular blank including two transverse edges and two parallel edges to a rectangular blank infeed point;

a transfer means for receiving and positioning said rectangular blank at said infeed point;

a mandrel means for forming a cylindrical blank positioned adjacent the transfer receiving means and extending from said rectangular blank infeed point to a cylindrical blank discharge point;

a conveyor means for transporting said rectangular blank along said mandrel means in a direction parallel to said parallel edges of said rectangular blank;

a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;

said folding means includes two pre-fold rails which guide the blank as it is transported along said mandrel means from a flat rectangular blank into a vertical "U" shaped configuration;

a heating means for applying heat to said parallel edges of said rectangular blank;

a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel; and a seating means for engaging said cylindrical blank positioned on a final forming mandrel to ensure proper positioning thereof.

11. An apparatus according to claim 10, wherein said folding means further includes intermediate folding guides to initiate the overlap of said parallel edges of said blank.

12. An apparatus according to claim 11, wherein the folding means further includes final folding guides to overlap said parallel edges of said blank.

13. An apparatus according to claim 12, wherein the folding means further includes spring-loaded lower guide bars positioned on each side of a lower portion of said tubular forming mandrel and in engagement with said blank at the same time as said final folding guides which overlap said parallel edges of said blank.

14. An apparatus for forming a cylindrical blank from a rectangular blank of foam sheet material comprising:
a delivery means for supplying a rectangular blank including two transverse edges and two parallel edges to a rectangular blank infeed point;

a transfer means for receiving and positioning said rectangular blank at said infeed point;

a mandrel means for forming a cylindrical blank positioned adjacent the transfer receiving means and extending from said rectangular blank infeed point to a cylindrical blank discharge point;

a conveyor means for transporting said rectangular blank along said mandrel means in a direction parallel to said parallel edges of said rectangular blank;

a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;

a heating means for applying heat to said parallel edges of said rectangular blank;

said heating means includes at least one side seam heater for applying heat to at least one parallel edge of said blank prior to said parallel edges being folded in an overlap position;

a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel; and a seating means for engaging said cylindrical blank positioned on a final forming mandrel to ensure proper positioning thereof.

15. An apparatus for forming a cylindrical blank from a rectangular blank of foam sheet material comprising:
a delivery means for supplying a rectangular blank including two transverse edges and two parallel edges to a rectangular blank infeed point;
a transfer means for receiving and positioning said rectangular blank at said infeed point;
a mandrel means for forming a cylindrical blank positioned adjacent the transfer receiving means and extending from said rectangular blank infeed point to a cylindrical blank discharge point;
a conveyor means for transporting said rectangular blank along said mandrel means in a direction parallel to said parallel edges of said rectangular blank;
a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;
a heating means for applying heat to said parallel edges of said rectangular blank;
said heating means includes two side seam heaters for applying heat to the outside parallel edge of one side of said blank at a selected temperature and for applying heat to the inside parallel edge of the other side of said blank at a selected temperature prior to said parallel edges being folded in an overlap position;
a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel; and
a seating means for engaging said cylindrical blank positioned on a final forming mandrel to ensure proper positioning thereof.

16. An apparatus for forming a cylindrical blank from a rectangular blank of foam sheet material comprising:
a delivery means for applying a rectangular blank including two transverse edges and two parallel edges to a rectangular blank infeed point;
a transfer means for receiving and positioning said rectangular blank at said infeed point;
a mandrel means for forming a cylindrical blank positioned adjacent the transfer receiving means and extending from said rectangular blank infeed point to a cylindrical blank discharge point;
a conveyor means for transporting said rectangular blank along said mandrel means in a direction parallel to said parallel edges of said rectangular blank;
a folding means for shaping said rectangular blank positioned adjacent said mandrel means, said folding means progressively folding said rectangular blank around said mandrel means from said infeed point to said discharge point to overlap said parallel edges of said rectangular blank on said mandrel to form a cylindrical blank;
a heating means for applying heat to said parallel edges of said rectangular blank;
a seaming means for applying pressure to said heated parallel edges of said cylindrical blank to affix said parallel edges of said cylindrical blank together and transporting said cylindrical blank along said mandrel, out of engagement with said conveyor means at a reduced diameter portion of said mandrel and producing the momentum necessary to position said cylindrical blank on a final forming mandrel;
said seaming means includes an endless belt biased into engagement with said heated overlapped parallel edges of said cylindrical blank to affix said edges together; and
a seating means for engaging said cylindrical blank positioned on a final forming mandrel to ensure proper positioning thereof.

17. An apparatus according to claim 16, wherein said endless belt is biased by a plurality of spring-loaded rollers.

18. An apparatus according to claim 16, wherein said endless belt is biased by a tension pulley.

19. Means forming two-piece containers from rectangular sidewall blanks and disc-shaped bottom blanks of thermoplastic sheet material comprising:
conveyor means feeding a plurality of longitudinally stretch oriented rectangular blanks along a predetermined path transversely of the longitudinal dimension thereof;
cylindrical mandrel means positioned parallel with said predetermined path adjacent said conveyor means;
folding means adjacent said mandrel means over a portion of the length of the latter engaging and progressively folding said blank about said mandrel means while feeding said blank along said path to overlap the ends thereof on said mandrel in the provision of a lapped seam;
heating means adjacent said path for progressively applying heat at a selected temperature to each of the ends of said blank to prepare said blank for heat sealing of said lapped seam; and
sealing means adjacent said mandrel downstream of said folding means for pressing said heated ends of said blank together to seal said lapped seam to provide a cylindrical blank on said mandrel;
a plurality of final forming mandrels;
second conveyor means sequentially indexing said final forming mandrel into coaxial position with one end of said cylindrical mandrel means;
ejection means ejecting said cylindrical blanks from said cylindrical mandrel at a reduced diameter portion thereof onto said final forming mandrels in synchronism with said indexing of the latter with the former;
supply means providing a plurality of disc-shaped bottom blanks for said containers sequentially indexed with said final forming mandrels to supply bottom blanks thereto;
said final forming mandrels each comprising at least a sidewall and bottom portion for receiving said cylindrical and bottom blanks, respectively;
means retaining said bottom blanks on said bottom portion of said final forming mandrels;
a heat tunnel heated to a temperature sufficient to shrink said cylindrical blanks into conformal engagement with said sidewall portion and over the peripheries of said bottom blanks through said heat tunnel;

bottom ironing means downstream of said heat tunnel means compressing said overlapped O portions of said sidewall and bottom blank to seal the bottom of said two piece container;

and discharge means ejecting said container from said final forming mandrels downstream of said bottom ironing means.

20. The inventor defined in claim 19, wherein said forming means further includes;

top curl forming means receiving said ejected containers from said discharge means, forming a top curl configuration thereon and ejecting said finished containers therefrom.

21. The invention defined in claim 19, wherein said supply means comprises:

a roll of strip stock;

rotary die means sequentially cutting bottom blanks from said roll of strip stock; and rotary transfer means comprising turret means having peripherally spaced disc retaining means mutually indexed with final forming mandrel means to transfer said bottom blanks from the former to the said bottom portion of the latter.

22. The invention defined in claim 19, wherein said means retaining said bottom blanks on said bottom portion of said final forming mandrels comprises;

vacuum ports formed in said mandrels extending through the surface of said bottom portion;

hose means connected with said vacuum ports;

a vacuum manifold means connected with said hose means;

a source of vacuum; and porting means in said manifold means selectively interconnecting said source to said hose means to retain said bottom blanks on said final forming mandrels for a predetermined period of time.

23. The invention defined in claim 22, wherein said discharge means comprises:

a source of positive pressure; and second porting means in said manifold means selectively interconnecting said source of positive pressure to said hose means to transmit pressure through said vacuum ports in said final forming mandrels to eject finished containers therefrom.

24. The invention defined in claim 19, wherein said bottom ironing means comprises rotary turret means adjacent said second conveyor means;

ironing plate means peripherally mounted on said turret means for radial displacement thereon;

means indexing said ironing plates one with each said final forming mandrels; and cam means driving said plate means into compressive engagement with said overlapped portions of said bottom sidewall and bottom blank.

25. The invention defined in claim 19, wherein said supply means comprises:

a roll of strip stock;

rotary die means sequentially cutting bottom blanks from said roll of strip stock;

rotary transfer means comprising turret means having peripherally spaced disc retaining means mutually indexed with said final forming mandrel means to transfer said bottom blanks from the former to the said bottom portion of the latter; and wherein said means retaining said bottom blanks on said bottom portion of said final forming mandrels comprises:

vacuum ports formed in said mandrels extending through the surface of said bottom portion;

hose means connected with said vacuum ports;

a vacuum manifold means connected with said hose means;

a source of vacuum; and porting means in said manifold means selectively interconnecting said source to said hose means to retain said bottom blanks on said final forming mandrels for a predetermined period of time.

26. The invention defined in claim 25, wherein said discharge means comprises:

a source of positive pressure; and second porting means in said manifold means selectively interconnecting said source of positive pressure to said hose means to transmit pressure through said vacuum ports in said final forming mandrels to eject finished containers therefrom.

27. The invention defined in claim 19, wherein said bottom ironing means comprises rotary turret means adjacent said conveyor means;

ironing plate means peripherally mounted on said turret means for radial displacement thereon;

means indexing said ironing plates one with each said final forming mandrels;

cam means driving said plate means into compressive engagement with said overlapped portions of said bottom sidewall and bottom blank; and wherein said means retaining said bottom blanks on said bottom portion of said final forming mandrels comprises:

vacuum ports formed in said mandrels extending through the surface of said bottom portion;

hose means connected with said vacuum ports;

a vacuum manifold means connected with said hose means;

a source of vacuum; and porting means in said manifold means selectively interconnecting said source to said hose means to retain said bottom blanks on said final forming mandrels for a predetermined period of time.

28. The invention defined in claim 27, wherein said discharge means comprises:

a source of positive pressure; and second porting means in said manifold means selectively interconnecting said source of positive pressure to said hose means to transmit pressure through said vacuum ports in said final forming mandrels to eject finished containers therefrom.

* * * * *